US012602899B1

(12) United States Patent
Krcmar et al.

(10) Patent No.: US 12,602,899 B1
(45) Date of Patent: Apr. 14, 2026

(54) AUTHENTICATION AND IDENTIFICATION OF PHYSICAL OBJECTS USING IMMUTABLE PHYSICAL CODE

(71) Applicant: Veracity Protocol Inc., New York, NY (US)

(72) Inventors: Jakub Krcmar, Smrzice (CZ); Roman Komarek, Prague (CZ); Kamil Behun, Kuřim (CZ)

(73) Assignee: Veracity Protocol Inc., New York, NY (US)

( * ) Notice: Subject to any disclaimer, the term of this patent is extended or adjusted under 35 U.S.C. 154(b) by 288 days.

(21) Appl. No.: 18/437,080

(22) Filed: Feb. 8, 2024

Related U.S. Application Data

(60) Provisional application No. 63/489,989, filed on Mar. 13, 2023, provisional application No. 63/489,988, filed on Mar. 13, 2023, provisional application No. 63/489,992, filed on Mar. 13, 2023, provisional application No. 63/489,991, filed on Mar. 13, 2023, provisional application No. 63/489,993, filed on Mar.

(Continued)

(51) Int. Cl.
| | |
|---|---|
| *G06V 10/44* | (2022.01) |
| *G06T 7/11* | (2017.01) |
| *G06V 10/74* | (2022.01) |
| *G06V 10/764* | (2022.01) |

(52) U.S. Cl.
CPC ............... *G06V 10/44* (2022.01); *G06T 7/11* (2017.01); *G06V 10/761* (2022.01); *G06V 10/764* (2022.01)

(58) Field of Classification Search
CPC .... G06V 10/04; G06V 10/761; G06V 10/764; G06T 7/11
See application file for complete search history.

(56) References Cited

U.S. PATENT DOCUMENTS

| | | | |
|---|---|---|---|
| 8,180,174 B2 | 5/2012 | Di Venuto et al. | |
| 8,306,315 B2 | 11/2012 | Inoue et al. | |

(Continued)

FOREIGN PATENT DOCUMENTS

| | | |
|---|---|---|
| CN | 109919252 A | 6/2019 |
| CN | 118116036 A | 5/2024 |

(Continued)

*Primary Examiner* — Ming Shui
(74) *Attorney, Agent, or Firm* — MUGHAL GAUDRY & FRANKLIN PC

(57) ABSTRACT

The present disclosure relates to a method for identifying or authenticating a physical object using computer vision models with machine learning algorithms. The method includes capturing an image of the physical object, focusing on a portion of the physical object in more detail to capture a first analysis image. The method further includes determining a first set of features associated with the first analysis image, generating a first feature-vector for the physical object, comparing the first feature-vector with a second feature-vector, and generating a notification associated with a status for identification or authentication of the physical object based on the comparison. The second feature-vector is generated from a second set of features that are associated with a second analysis image. The first feature-vector is compared with the second feature-vector to determine a match. A notification is generated indicating a status of the machine matching of the physical object.

16 Claims, 17 Drawing Sheets

Related U.S. Application Data 13, 2023, provisional application No. 63/489,995, filed on Mar. 13, 2023, provisional application No. 63/483,900, filed on Feb. 8, 2023, provisional application No. 63/483,887, filed on Feb. 8, 2023, provisional application No. 63/483,896, filed on Feb. 8, 2023, provisional application No. 63/483,893, filed on Feb. 8, 2023, provisional application No. 63/483,903, filed on Feb. 8, 2023.

(56) References Cited

U.S. PATENT DOCUMENTS

| | | | |
|---|---|---|---|
| 8,705,873 | B2 | 4/2014 | Voloshynovskiy et al. |
| 8,774,455 | B2 | 7/2014 | Elmenhurst et al. |
| 9,152,862 | B2 | 10/2015 | Ross et al. |
| 9,208,394 | B2 | 12/2015 | Di Venuto Dayer et al. |
| 9,245,133 | B1 | 1/2016 | Durst et al. |
| 9,251,221 | B1 | 2/2016 | Murphey et al. |
| 9,350,552 | B2 | 5/2016 | Elmenhurst et al. |
| 9,443,298 | B2 | 9/2016 | Ross et al. |
| 9,582,714 | B2 | 2/2017 | Ross et al. |
| 9,646,206 | B2 | 5/2017 | Ross et al. |
| 9,720,934 | B1 | 8/2017 | Dube et al. |
| 10,043,073 | B2 | 8/2018 | Ross et al. |
| 10,192,140 | B2 | 1/2019 | Ross et al. |
| 10,289,910 | B1 | 5/2019 | Chen et al. |
| 10,691,971 | B2 | 6/2020 | Chang et al. |
| 10,740,767 | B2 | 8/2020 | Withrow |
| 10,824,858 | B2 | 11/2020 | Takahashi et al. |
| 10,839,528 | B2 | 11/2020 | Ross et al. |
| 10,843,552 | B2 | 11/2020 | Duermaier |
| 10,872,265 | B2 | 12/2020 | Ross et al. |
| 10,915,612 | B2 | 2/2021 | Withrow et al. |
| 10,915,749 | B2 | 2/2021 | Ross et al. |
| 10,963,670 | B2 | 3/2021 | Ross et al. |
| 10,964,010 | B2 | 3/2021 | Di Venuto Dayer, V et al. |
| 11,062,118 | B2 | 7/2021 | Ross |
| 11,100,352 | B2 | 8/2021 | Lee et al. |
| 11,238,146 | B2 | 2/2022 | Ross |
| 11,250,286 | B2 | 2/2022 | Ross |
| 11,321,964 | B2 | 5/2022 | Withrow et al. |
| 11,379,856 | B2 | 7/2022 | Withrow |
| 11,386,697 | B2 | 7/2022 | Ross et al. |
| 11,423,641 | B2 | 8/2022 | Ross et al. |
| 11,488,413 | B2 | 11/2022 | Ross et al. |
| 11,636,191 | B2 | 4/2023 | Withrow et al. |
| 11,637,687 | B2 | 4/2023 | Smith et al. |
| 11,663,849 | B1 | 5/2023 | Ross et al. |
| 11,741,205 | B2 | 8/2023 | Ross et al. |
| 11,900,646 | B2 | 2/2024 | Amon et al. |
| 12,051,253 | B2 | 7/2024 | Almers et al. |
| 12,078,597 | B2 | 9/2024 | Liu et al. |
| 12,249,074 | B2 | 3/2025 | Cho et al. |
| 12,272,133 | B2 | 4/2025 | Pegurri et al. |
| 12,412,254 | B2 | 9/2025 | Le Henaff |
| 2009/0245596 | A1 | 10/2009 | Niinuma |
| 2010/0195894 | A1 | 8/2010 | Lohweg et al. |
| 2011/0135160 | A1 | 6/2011 | Sagan et al. |
| 2012/0219194 | A1 | 8/2012 | Monden |
| 2013/0170758 | A1 | 7/2013 | G |
| 2014/0300722 | A1* | 10/2014 | Garcia .................. G01B 11/02 348/135 |
| 2014/0333794 | A1 | 11/2014 | Rhoads et al. |
| 2015/0117701 | A1 | 4/2015 | Ross et al. |
| 2015/0189238 | A1 | 7/2015 | Ishiyama et al. |
| 2015/0302421 | A1 | 10/2015 | Caton et al. |
| 2016/0055398 | A1 | 2/2016 | Ishiyama et al. |
| 2017/0032285 | A1 | 2/2017 | Sharma et al. |
| 2017/0287147 | A1 | 10/2017 | Takahashi et al. |
| 2018/0189611 | A1 | 7/2018 | Dal Mutto et al. |
| 2018/0341810 | A1 | 11/2018 | Prest |
| 2020/0104992 | A1 | 4/2020 | Schumacher et al. |
| 2020/0320334 | A1 | 10/2020 | Ramachandrula et al. |
| 2020/0342259 | A1 | 10/2020 | Jordan et al. |
| 2020/0380359 | A1 | 12/2020 | Finnie et al. |
| 2020/0394399 | A1 | 12/2020 | Gilbert et al. |
| 2021/0090011 | A1 | 3/2021 | Rae |
| 2021/0374444 | A1 | 12/2021 | Shannon et al. |
| 2022/0157048 | A1 | 5/2022 | Ting et al. |
| 2022/0414398 | A1* | 12/2022 | Krishnamurthy .... G06V 10/225 |
| 2023/0306539 | A1 | 9/2023 | Frei et al. |
| 2023/0325434 | A1 | 10/2023 | Chan et al. |
| 2024/0037610 | A1 | 2/2024 | Porter et al. |
| 2025/0245979 | A1 | 7/2025 | Pegurri et al. |

FOREIGN PATENT DOCUMENTS

| | | |
|---|---|---|
| CN | 119445149 A | 2/2025 |
| WO | 2007028799 A1 | 3/2007 |
| WO | 2015157526 A1 | 10/2015 |
| WO | 2020235577 A1 | 11/2020 |
| WO | 2022031232 A1 | 2/2022 |
| WO | 2023114776 A1 | 6/2023 |

* cited by examiner

100

102

800-1

800-2

Search

Scarf_XYZ_123456 Identified

Item Details

822

824

826

828

900

1100

1102 — Determine feature(s)

1104 — Feature information > information threshold

No → 1106 — Discard feature(s)

Yes

1108 — Feature density > density threshold

No → 1110 — Discard image area(s)

Yes

1112 — Select image area with highest feature density

1200

1202 — Identify select feature(s) from analysis image

1204 — patch feature count > patch threshold

No → 1206 — Discard segments

Yes

1208 — Select patch(es)

1210 — Determine transformation function(s)

1212 — Generate feature vector(s) for select patch(es)

1214 — Generate physical code using feature vector(s)

1300

1302 — Receive input(s) to categorize an object

1304 — Retrieve an analysis image based on the received input(s)

1306 — Generate a template for analysis image

1308 — Capture real-time image feed of the object

1310 — Compare image feed with template

1312 — Generate overlapping score

1314 — Overlapping score > overlapping threshold

No

Yes

1316 — Notify to capture analysis image of the object

AUTHENTICATION AND IDENTIFICATION OF PHYSICAL OBJECTS USING IMMUTABLE PHYSICAL CODE

PRIORITY

This application is a non-provisional of and claims priority to the following U.S Provisional Patent Applications: (1) U.S. Patent Application No. 63/483,887, filed Feb. 8, 2023, and entitled "SYSTEMS AND METHODS FOR ENHANCED AUTHENTICATION AND IDENTIFICATION OF PHYSICAL OBJECTS"; (2) U.S. Patent Application No. 63/483,893, filed Feb. 8, 2023, and entitled "SYSTEMS AND METHODS FOR ENHANCED AUTHENTICATION AND IDENTIFICATION OF PHYSICAL OBJECTS"; (3) U.S. Patent Application No. 63/483,896, filed Feb. 8, 2023, and entitled "SYSTEMS AND METHODS FOR ENHANCED AUTHENTICATION AND IDENTIFICATION OF PHYSICAL OBJECTS"; (4) U.S. Patent Application No. 63/483,900, filed Feb. 8, 2023, and entitled "SYSTEMS AND METHODS FOR ENHANCED AUTHENTICATION AND IDENTIFICATION OF PHYSICAL OBJECTS"; (5) U.S. Patent Application No. 63/483,903, filed Feb. 8, 2023, and entitled "SYSTEMS AND METHODS FOR ENHANCED AUTHENTICATION AND IDENTIFICATION OF PHYSICAL OBJECTS"; (6) U.S. Patent Application No. 63/489,995, filed Mar. 13, 2023, and entitled "AUTHENTICATION AND IDENTIFICATION OF PHYSICAL OBJECTS USING IMMUTABLE PHYSICAL CODE"; (7) U.S. Patent Application No. 63/489,993, filed Mar. 13, 2023, and entitled "AUTHENTICATION AND IDENTIFICATION OF PHYSICAL OBJECTS USING MACHINE VISION PROTOCOLS"; (8) U.S. Patent Application No. 63/489,992, filed Mar. 13, 2023, and entitled "AUTHENTICATION AND IDENTIFICATION OF PHYSICAL OBJECTS USING MICROSTRUCTURAL FEATURES"; (9) U.S. Patent Application No. 63/489,991, filed Mar. 13, 2023, and entitled "AUTHENTICATION AND IDENTIFICATION OF PHYSICAL OBJECTS USING VOTING OF LOCAL MICROSTRUCTURAL FEATURES"; (10) U.S. Patent Application No. 63/489,989, filed Mar. 13, 2023, and entitled "AUTHENTICATION AND IDENTIFICATION OF PHYSICAL OBJECTS USING SELECTION OF STRONG MICROSTRUCTURAL FEATURES"; and (11) U.S. Patent Application No. 63/489,988, filed Mar. 13, 2023, and entitled "AUTHENTICATION AND IDENTIFICATION OF PHYSICAL OBJECTS USING FIXED-SIZE REPRESENTATION". The contents of the aforementioned applications are incorporated herein by reference in their entirety.

BACKGROUND

The present disclosure generally relates to systems and methods for verifying the authenticity and/or recognizing the identity of an individual physical object or a batch of physical objects of any material with any camera or hardware, an immutable function, and machine learning algorithms.

The identification and verification of physical objects are essential for various industries, such as banking, retail, manufacturing, etc. The physical attachment of an identifier to a physical object has various challenges. Most often, the identifier is physically attached or printed on the cover of a physical object that is required to be removed for use of the product. Moreover, the identifiers permanently attached to objects often tend to fade with usage and time. As the identity of an associated object relies completely on the attached identifier, such situations result in the loss of object identity information. Furthermore, printable identifiers are easy to duplicate and attach to counterfeit objects to results in an increased supply of counterfeit goods.

Another challenge arises with scanning the identifier for authentication or identification of the associated object. Variations in environmental conditions such as lighting, configuration and specification of scanner used, etc. add up to the challenges. Even bar code scanners can have difficulty reading consistently. Holographic stickers can be counterfeited too and degrade with usage for used goods.

A technical problem arises when using digital images to perform verification of physical objects. A wide range of techniques exist for verifying the authenticity and identity of a physical object. Conventional techniques will compare images of physical objects and match those images. Lighting, optical camera differences, and many other factors make image matching unreliable.

SUMMARY

The present disclosure relates to systems and methods for using any camera to generate a tamper-proof physical code that represents the distinctive material structure of a physical object or a batch of physical objects. The physical code, computer vision, and machine-learning techniques can be used to determine whether the physical object is authentic or a fake or counterfeit replica of the original physical object. The present disclosure also relates to techniques for determining the identity of an object or a batch of objects based on material characteristics on the surface of the object distinctive. Various embodiments of the present disclosure relate to a system for machine authentication of a physical object using computer vision and machine learning (ML) algorithms for comparing attributes of the physical object and various processes for a method thereof.

In an embodiment, the method includes capturing an image of the physical object with the computer vision and focusing the computer vision on the physical object based on information of the physical object in the image. The method further includes capturing, in response to the focusing the computer vision, a first analysis image of the physical object with the computer vision. The first analysis image is covering less area than the image. Furthermore, the method includes determining a first set of features associated with the first analysis image using a ML model. The ML model includes a first set of functions for the first set of features. Furthermore, the method includes generating a first feature-vector for the physical object based on the first set of features. Furthermore, the method compares the first feature-vector with a second feature-vector, and generating, in response to comparing the first feature-vector with the second feature-vector, a notification associated with a status for machine authentication of the physical object. The second feature-vector is generated from another set of features that are associated with another analysis image.

In another embodiment, the method further includes receiving a categorization input. Furthermore, the method includes determining, in response to reception of the categorization input, a first set of parameters and a second set of parameters for the physical object, the first set of parameters corresponds to a first information associated with a structure of material of the physical object and the second set of parameters corresponds to a second information associated with a process of manufacturing the physical object.

The first set of features are determined based on the first and second sets of parameters using the ML model.

In yet another embodiment, the method further includes determining an object type for the physical object based on the categorization input. Each feature in the first set of features is selected from another set of features based on the object type. The determination of the object type is partially by classification of the image using the ML model.

In yet another embodiment, the method further includes determining that the object type is associated with a requirement of an artificial illumination and generating, in response to the determination that the object type is associated with the requirement of the artificial illumination, an illumination signal to enable the artificial illumination on the physical object.

In yet another embodiment, the method further includes the first analysis image into a plurality of select patches. The first set of features is determined from a select patch of the plurality of select patches. In some aspects of the present disclosure, segmenting the analysis image includes determining, based on the object type, an information associated with features in the first set of features and assigning a context score to each feature in the first set of features based on the information. Segmenting the analysis image further includes determining one or more select feature from the first set of features based on the context score of each feature in the first set of features, determining presence of a select feature of the one or more select features in each patch of the plurality of patches, and identifying, in response to the determination of presence of the select feature in a patch of the plurality of patches, the patch as the select patch.

In some other aspects of the present disclosure, select patch has a length of at least 1 cm and a width of at least 1 cm, the first analysis image has a resolution of 800 pixels per inch (ppi) or more, and a count of features in the first set of features is at least ten. The ten or more features can be selected for the type of object from 500-1000 different possible features that can be measured by the camera in each patch.

In yet another embodiment, the method further includes determining a relative alignment of the physical object with respect to a camera that is used to capture the first analysis image. Furthermore, the method includes comparing the relative alignment with a pre-defined alignment, determine, based on the comparison of the relative alignment with the predefined alignment, that a change in relative alignment is required and generating, in response to the determination that the change in the relative alignment is required, a notification for requirement of the change in the relative alignment of the physical object with respect to the camera.

In some aspects of the present disclosure, the method further includes presenting the notification for requirement of the change in the relative alignment of the physical object with respect to the camera on an augmented reality interface.

Other embodiments of this aspect include corresponding computer systems, apparatus, and computer programs recorded on one or more computer storage devices, each configured to perform the actions of the methods.

Some other embodiments include a computer-program product tangibly embodied in a non-transitory machine-readable storage medium, including instructions configured to cause a data processing apparatus to perform operations of the method for machine authentication of a physical object using computer vision and ML algorithms for comparing attributes of the physical object.

Further areas of applicability of the present disclosure will become apparent from the detailed description provided hereinafter. It should be understood that the detailed description and specific examples while indicating various embodiments, are intended for purposes of illustration only and are not intended to necessarily limit the scope of the disclosure.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the appended figures, similar components and/or features may have the same reference label. Further, various components of the same type may be distinguished by following the reference label with a second alphabetical label that distinguishes among the similar components. If only the first reference label is used in the specification, the description applies to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
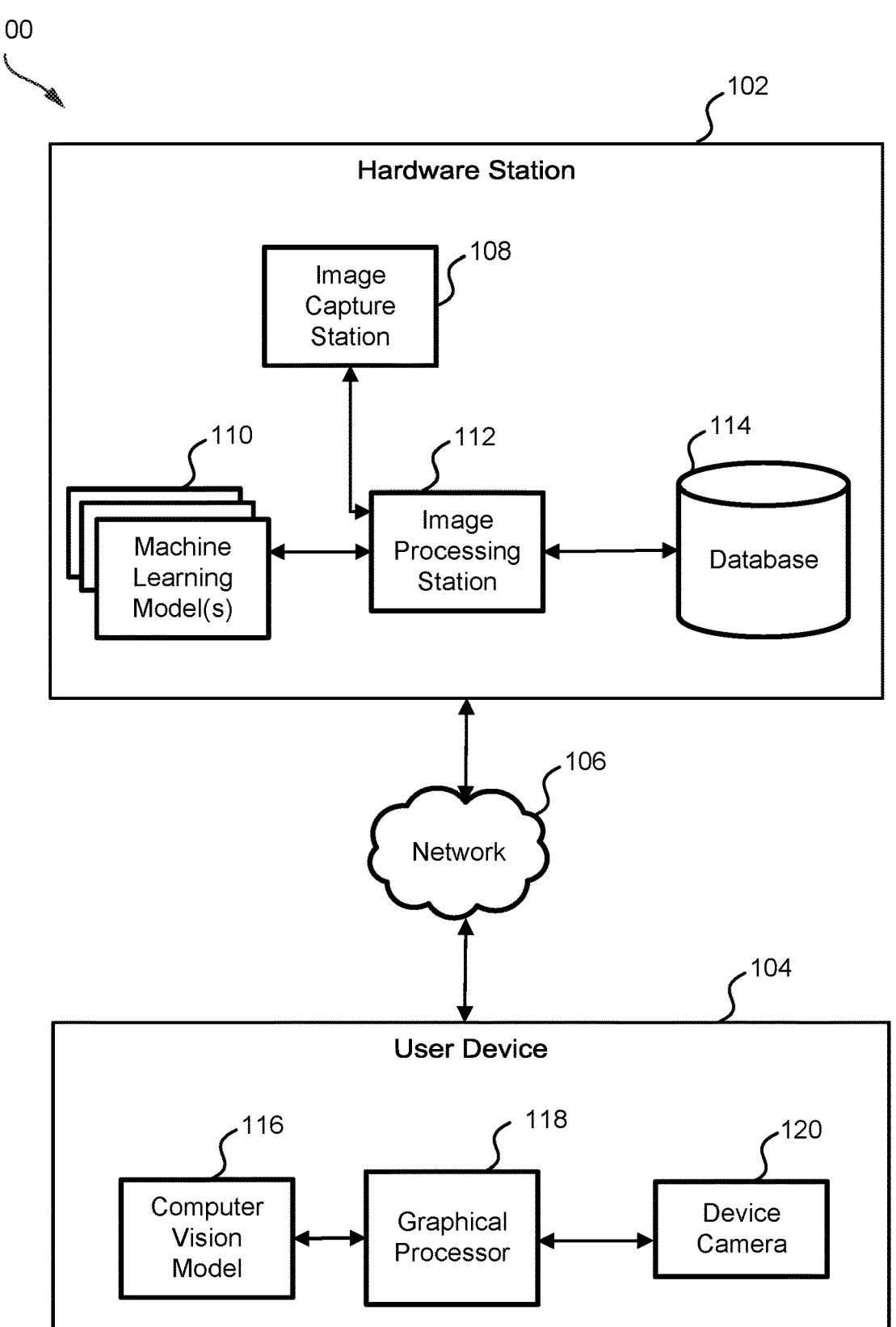
FIG. 1 illustrates a block diagram of a system for the identification or authentication of a physical object, according to an exemplary embodiment.

FIG. 1 is a block diagram of system 100 for identification or authentication of a physical object, according to an exemplary embodiment. System 100 provides machine authentication of a physical object using computer vision and machine learning (ML) algorithms for comparing attributes of the physical object. System 100 includes a hardware station 102 and a user device 104 communicatively coupled to each other by a network 106. It is noted that a single-user device (e.g., shown as user device 104) is for illustration, and the scope of the present disclosure is not limited to it. System 100 may host a number of user devices sequentially, alternatively, or parallelly.

Hardware station 102 provides hardware infrastructure to perform a number of data storage and data processing operations that enable system 100 to verify the authenticity and/or identity of a physical object (hereinafter interchangeably referred to as "object"). Hardware station 102 can have some components locally at a workstation and others remotely at a data center in the cloud, or any combination thereof. The local and/or remote components collectively have the resources for storing and processing data as outlined in this application. In this way, hardware station 102 can be a combination of a computer-vision based workstation and a cloud server.

Hardware station 102 includes an image capture station 108, machine learning (ML) model(s) 110 supporting an image processing station 112, and a database 114. Various components of hardware station 102 are coupled with others using wired/wireless communication media. In some embodiments, image capture station 108 may include camera module(s) configured to capture and share the image(s) of the object(s).

In some other embodiments, image capture station 108 may include laser scanner module(s). The laser scanner module(s) may include laser scanner(s). The laser scanner(s) may perform a 3-Dimensional (3D) scan of the object and generate point cloud(s) based on the scan. The laser scanner(s) may further derive precise information of the object using the point clouds and generate image(s) of the object using the precise information. In some aspects of the present disclosure, the laser scanner module(s) may further include laser interferometer(s) to determine information related to material composition(s) of the object.

Image processing station 112 includes processing circuitry supported by ML model(s) 110. The processing circuitry is configured for a variety of operations. The operations may be associated with image processing, notification generation, and/or data communication. ML model(s) 110 may include but is not limited to, Recommender Systems, Decision Trees and Random Forests, a variety of Neural Networks (such as Convolution Neural Networks (CNN), Recurrent Neural Networks (RNN), and the like), Support Vector Machines (SVM), eXtreme Gradient Boosting (i.e., XGBoost), and Gradient Boosting Machines. Database 114 may include a plurality of data storage repositories, configured to store and communicate data associated with various operations of hardware station 102. In some embodiments, database 114 may be a shared distributed ledger (such as Web3-based shared datacenter) or log file accessible by a number of user devices.

In some embodiments, user device 104 includes a computer vision model 116 supporting a graphical processor 118. User device 104 further includes a device camera 120. Various components of user device 104 are coupled to others using wired/wireless media. Device camera 120 may be configured to capture the image(s) of an object. The images may be provided in a compressed format (JPEG, GIF, PNG, etc.) or in RAW image format with minimally processed data with metadata about the image and device camera 120. Graphical processor 118 may include graphical processing circuitry configured to enable the camera to capture image(s) of the object with a pre-defined specification. Graphical processor 118 may further be configured to enable transmission of image(s) of the object when captured with the pre-defined specification. In some embodiment, the device camera 120 includes the graphical processor 118 in a hybrid module or even in a single semiconductor chip.

User device 104 may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®).

Network 106 may include suitable logic, circuitry, and interfaces configured to provide several network ports and several communication channels for transmission and reception of data and/or instructions related to operations of hardware station 102 and user device 104. Network 106 could include a WAN, LAN, and/or the Internet for various embodiments. Some systems 100 could have multiple hardware stations throughout the warehouse or factory lines connected by network 106. There could be distributed plants at different locations tied together by network 106.

In operation, image capture station 108 captures RAW image(s) of an object. The term 'RAW image' as used herein is referred to as an un-processed digital image of the physical object that is captured using a camera setup in a pre-identified environmental condition.

In another embodiment, image capture station 108 generates first laser beam(s) to scan the object and generate 3D point cloud(s) for the object. The point cloud(s) include information of geometry of the object. Image capture station 108 may further generate RAW image(s) of the object using the information of the geometry of the object derived from the point cloud(s).

Image capture station 108 further sends the RAW image(s) to image processing station 112 for further processing.

In an embodiment, image processing station 112 receives input(s) to categorize the physical object. The input(s) include metadata of the object including object name, object category, etc. Based on the received input(s), image processing station 112 attaches the metadata of the object to the RAW image(s) to generate labelled image(s). Image processing station 112 further determines multiple features from each labelled image. Furthermore, image processing station 112, based on the multiple features, determines information contained in each labelled image using ML model(s) 110. In some aspects of the present disclosure, image processing station 112 selects one image from the labeled image(s) of the object based on the information in each image.

Image processing station 112 further determines feature density throughout the selected image. In some aspects of the present disclosure, the feature density is associated with a count of features corresponding to each pixel of the image.

In an embodiment, based on the feature density, image processing station 112 determines an analysis area for the object. In some aspects of the present disclosure, image processing station 112 determines multiple segments of pixels from the selected image with at least a pre-defined size and at least a pre-defined feature density and selects the segment with the highest feature density as the analysis area.

In another embodiment, image processing station 112 determines a feature density distribution from the selected image. Image processing station 112 further segments the selected image into multiple segments based on the feature density distribution. Furthermore, image processing station 112 compares the feature density of each segment with a density threshold. Furthermore, image processing station 112 selects segment(s) from the multiple segments having feature density higher than the density threshold and identifies the selected segment(s) as analysis area(s). The density threshold may be different for different objects and may be selected based on the categorization input(s) for the object.

In an exemplary scenario, an object may have feature density distribution higher than the object threshold, which means that the entire surface of the object contains features to be analyzed. In such a case, a portion of selected image capturing the object may be selected as the analysis image.

In response to the determination of the analysis area, image processing station 112 generates a trigger signal that enables image capture station 108 to capture analysis image of the object. The analysis image captured by image capture station 108 is smaller in size than the labelled image(s) of the object as it captures an area of the labelled image(s) in high resolution. In other words, the analysis image covers less area than the labelled image(s). Preferably, the analysis image has a pixel density of at least 800 pixels per inch (ppi).

In some aspects of the present disclosure, image capture station 108 may further generate second laser beam(s) that is relatively denser and more focused (i.e., a width of the second laser beam(s) is less than the width of the first laser beam(s)). The second laser beam(s) being reflected by the analysis area of the object are received by image capture station 108 to generate analysis point cloud(s). Image capture station 108 further generates the analysis image using the analysis point cloud(s).

In some aspects of the present disclosure, image processing station 112 generates a translucent template (e.g., an Augmented Reality (AR) filter) for the determined analysis area. The translucent template (hereinafter interchangeably referred to as 'template') can be displayed to a user of image capture station 108 in combination with a real-time image feed (such as a video feed) of the object. This facilitates the user of image capture station 108 to alter the alignment of the object for capturing the analysis image when matching the template. In some other aspects of the present disclosure, the image processing station 112 captures a video feed and compares the video feed in real-time with the template to generate navigation notification(s) that can be displayed to the user of image capture station 108 and enable alignment of the object to be adjusted to capture the analysis image.

In some aspects of the present disclosure, for a batch of identical objects, the analysis area for each object in the batch may be similar, and therefore, one template can be generated for the entire batch of identical objects. Image capture station 108 further sends the analysis image to image processing station 112 for further processing.

Image processing station 112 determines a set of features from the analysis image and identifies select feature(s) from the set of features using ML model(s) 110. The set of features may be a subset of the multiple features. In some aspects of the present disclosure, image processing station 112 generates a physical layer of information (hereinafter interchangeably referred to as 'physical layer') for the object. The term 'physical layer' as used herein is referred to as a set of numerical values corresponding to the set of features determined from the analysis image, that are arranged in accordance with a spatial arrangement of pixels in the analysis image. Image processing station 112 further segments the analysis image into multiple patches based on multiple select features. Preferably, each patch has at least ten select features of the multiple select features. In some aspects of the present disclosure, the multiple patches may be overlapping. In some other aspects of the present disclosure, at least two patches of the multiple patches may overlap. Overlapping of the patches is specific to presence of a predefined count of the select features in the analysis image that may vary for different physical objects.

Image processing station 112 further assigns a weight to each feature of each patch of the multiple patches using the ML model(s). Parallelly, image processing station 112 generates a transformation function for each patch based on feature(s) in each patch. Furthermore, image processing station 112 generates a feature-vector corresponding to each patch by transforming weighted feature(s) of each patch using the corresponding transformation function. Being dependent on the weighted feature(s) specifically selected for the object, the transformation function changes if any feature in any patch is changed. Therefore, the transformation function and the feature-vector for each patch are immutable. In some aspects of the present disclosure, the template, the analysis image, the feature-vectors, the transformation function(s), and the metadata of the object, in cumulation, generate a code layer of information (hereinafter interchangeably referred to as 'code layer') for the object. Image processing station 112 further generates a physical code for the object based on the code layer.

It must be noted that the functionality of various components of hardware station 102 is presented from the perspective of a single object for illustration. However, the scope of the present disclosure is not limited to it. Typically, the various components of hardware station 102 perform the same functionality for multiple objects as presented hereinabove without deviating from the scope of the present disclosure. In some aspects of the present disclosure, database 114 stores the physical code for each physical object of the multiple objects.

In another embodiment, when a request for authentication or identification of a physical object is generated by user device 104, hardware station receives categorization input(s) (hereinafter interchangeably referred to as 'inputs for categorization' of the object from user device 104. Based on the categorization input(s), hardware station 102 determines an object type for the object. In response, image processing station 112 retrieves a second physical code from database 114 corresponding to the input(s) for categorization of the object. The second physical code is generated by image processing station 112 at the time of training ML model(s) 110 for the object. In some aspects of the present disclosure, to generate the second physical code, image processing station 112 enables image(s) of the object to be captured using computer vision. Image processing station 112 further determines (or focuses on) a second analysis area from an image selected from the image(s). Furthermore, image processing station 112 generates a template for the object from the second analysis area and captures a second analysis image based on the template. Furthermore, image processing station 112 determines a second set of features from the second analysis area and determines a second set of select features using ML model(s) 110, that are specific to the object type associated with the object. Based on the second set of select features, image processing station 112 generates a second set of feature-vector (using second set of functions that are transformation functions and are specific to the object type). Furthermore, image processing station 112 generates the second physical code based on the second set of feature-vectors.

For verification of authenticity or identity of the object, image processing station 112 retrieves the template from the second physical code that enables a user of the user device to determine the first analysis area the object. Furthermore, image processing station 112 enables focusing the image capture station 108 (i.e., focusing the computer vision) on the first analysis area to capture a first analysis image. The first analysis image covers less area than the captured image(s). Image processing station 112 determines a first set of features from the first analysis image using the ML model(s) 110. Image processing station 112 further determines a first set of select features from the first set of features using the ML model(s) 110. Furthermore, image processing station 112 generates a first set of feature-vectors based on the first set of features using the first set of functions (i.e., set of transformation functions). The first set of feature-vectors are used by image processing station 112 to generate the first physical code. Image processing station 112 further compares the second physical code with the generated first physical code. Based on the comparison of the first and second physical codes, image processing station 112 verifies authenticity or identity of the physical object.

In some aspects of the present disclosure, image processing station 112 may utilize a first ML model of the ML model(s) 110 to determine the first set of features from the analysis image. Image processing station 112 may further use the first ML model to select the set of select features. In some aspects of the present disclosure, image processing station 112 may utilize a second ML model of the ML model(s) 110 to determine the set of transformation functions. Image processing station 112 may utilize the second ML model 110 to generate the first set of feature-vectors.

In yet another embodiment, when a request for determination of tampering to an object is generated by user device 104, hardware station 102 receives categorization input(s) from user device 104. In response, image processing station 112 retrieves the second physical code for the object from database 114 based on the input(s) for the categorization of the object. Image processing station 112 further retrieves the template from the retrieved second physical code, and used for capturing the second analysis image of the object at the time of training the ML model(s) 110 for the object. Image processing station 112 captures the first analysis image and determines the first physical layer, the first set of functions, and the second code layer based on the first analysis image as presented hereinabove. Moreover, using an inverse hash function image processing station 112 generates the second code layer from the retrieved second physical code. Furthermore, image processing station 112 retrieves second set of functions from the second code layer and compares the generated first set of functions with the retrieved second set of function. Based on the comparison, image processing station 112 determines any tampering with the physical object.

In yet another embodiment, when a request for identification of an object from a batch of identical objects is generated by user device 104, hardware station 102 receives input(s) for categorization of the object from user device 104. In response, based on the input(s) for categorization of the object, image processing station 112 retrieves a batch of physical codes and a template corresponding to the batch of identical objects from database 114. The template is generated for the batch of identical objects at a time of training the ML model(s) for the batch of identical objects. The template for the batch of identical enables user device 104 to capture an analysis image that is specific to the object to be identified. Image processing station 112 further captures a first analysis image based on the template and generates a first physical code for the object, which is compared with each physical code of the batch of physical codes by image processing station 112 to verify the identity of the physical object.

Figure 2:
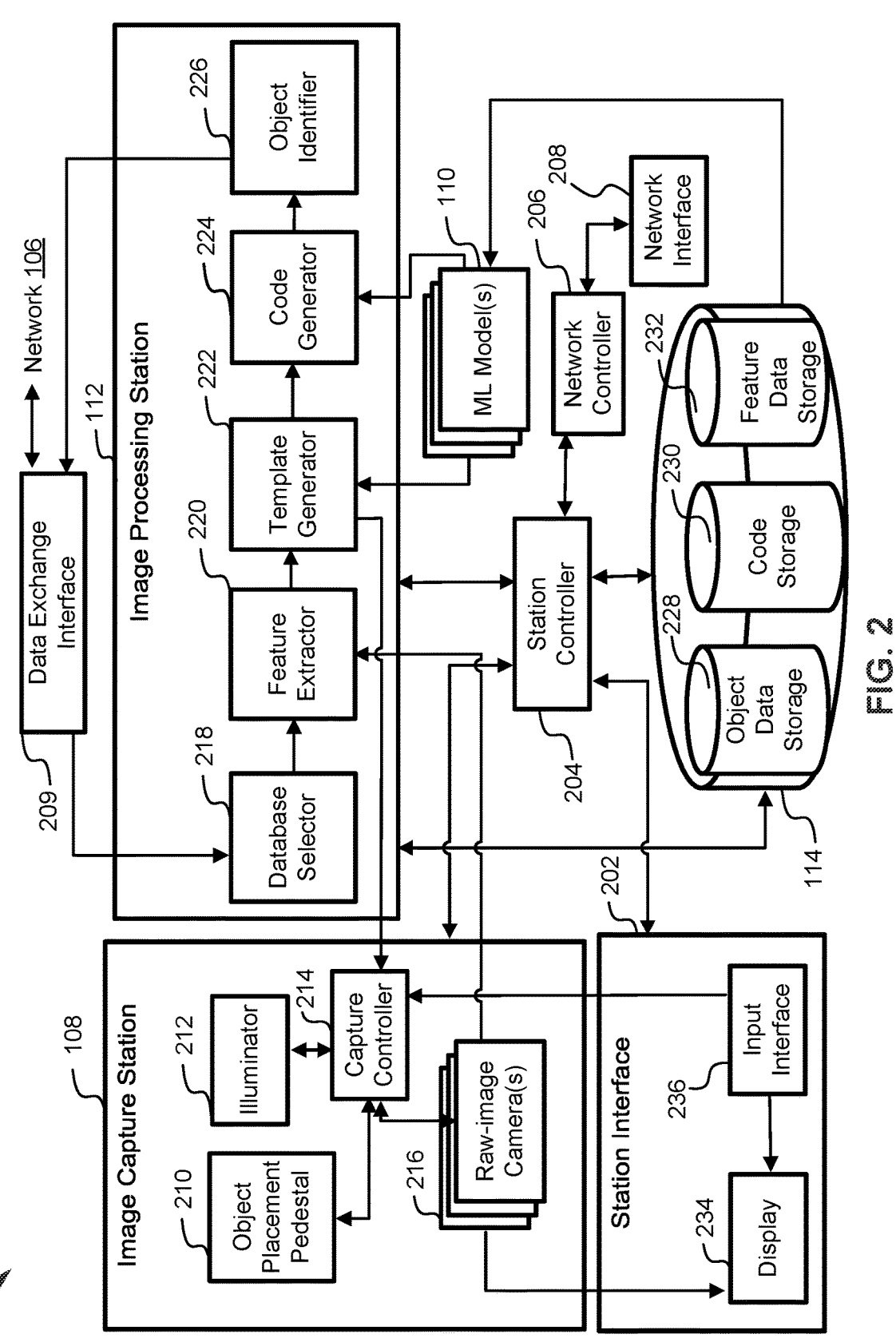
FIG. 2 illustrates a hardware station of the system, according to an exemplary embodiment.

FIG. 2 illustrates hardware station 102 of system 100, according to an exemplary embodiment. Hardware station 102 includes image capture station 108, ML model(s) 110 supporting image processing station 112, and the database as presented hereinabove. The hardware station further includes a station interface 202, a station controller 204, a communication controller connected to a network interface 208, and a data exchange interface 209.

Image capture station 108 may include an object placement pedestal 210, an illuminator 212, a capture controller 214, and RAW image camera(s) 216. Object placement pedestal 210 (hereinafter interchangeably referred to and designated as 'the pedestal 210') can be configured to hold a physical object in a pre-defined position and/or orientation relative to the RAW image camera(s). Pedestal 210 may further be configured to adjust the position and/or orientation of the object relative to the RAW image camera(s) through rotation, tilt, up-down motion, or a combination thereof. Illuminator 212 provides artificial illumination to the object. In some aspects of the present disclosure, illuminator 212 may include a photo sensor (not shown) and Light Emitting Diode (LED) light(s) (not shown). The photo sensor senses light intensity around the object and generates an illumination status signal corresponding to the light intensity around the object. The illumination status signal is sent to capture controller 214 that compares the illumination status signal with a pre-defined illumination configuration. Based on the comparison, capture controller 214 enables LED light(s) to glow. When the object is placed at the pre-defined alignment relative to RAW image camera(s) 216 and the illumination status signal matches with the pre-defined illumination configuration, capture controller 214 enables RAW image camera(s) 216 to capture RAW image (s) of the object. In some aspects of the present disclosure, the RAW image camera(s) may be configured to capture RAW image(s). Preferably, the RAW image(s) are standard or macro-images of the object. In some aspects of the present disclosure, capture controller 214 further determines a noise level in the RAW image(s). In a scenario, when the noise level in a RAW image is above a predefined noise threshold, capture controller 214 may discard the RAW image and generate a recapture signal to enable the RAW image camera(s) to re-capture another RAW image corresponding to the discarded RAW image.

In an embodiment, the RAW image camera(s) 216 may include laser scanner(s). The laser scanner(s) may further include a laser beam generator, laser sensor(s) (such as Light Detection and Ranging (LIDAR) sensor), and processing circuitry. In operation, the object may be placed (or held by) pedestal 210 that may rotate in a pre-defined direction with a predefined angular velocity. The laser scanner(s) may be placed at a pre-defined position relative to pedestal 210. The laser scanner(s), by way of the laser beam generator may generate the first laser beam(s). Being reflected by the object, the first laser beam(s) may be sensed by the laser sensor(s). The laser scanner(s) may further generate first laser array(s) based on the sensed first laser beam(s). Furthermore, the laser scanner(s) may generate the first point cloud(s) corresponding to the first laser array(s). Based on the first point cloud(s), the laser scanner(s) may derive precise information about the geometry of the object and generate RAW image(s) for the object. In some aspects of the present disclosure, to generate the RAW image, RAW image camera(s) 116 may transform the precise information derived from the first point cloud(s) into numeric pixel value(s). The numeric pixel value(s) may be determined by the RAW image camera(s) using a color model (such as RGB model, CMYK model, HSV model, YIQ model etc.).

In some other aspects of the present disclosure, the RAW image camera(s) 216 may further include a laser interferometer. The laser interferometer may determine a shift in phase of the laser beam(s) to determine material composition and/or micro-structures present on the object.

Image processing station 112 is supported by the ML model(s) 110. In some aspects of the present disclosure, image processing station 112 may include a database selector 218, a feature extractor 220, a template generator 222, a code generator 224, and an object identifier 226. Database selector 218 may be configured to receive input(s) for categorization of the object. The input(s) for categorization of the object may include metadata of the object. Based on the metadata, database selector 218 segregates the data of the multiple objects into a number of categories and/or sub-categories (i.e., an object type). In some aspects of the present disclosure, based on the metadata of the object, database selector 218 generates a database filter to select and retrieve data associated with the physical object from database 114. In some aspects of the present disclosure, ML model(s) 110 may support database selector 218 to derive information on metadata of the object and/or segregate the data of the multiple objects.

Feature extractor 220 may be configured to receive RAW image(s) of the object from image capture station 108 and metadata of the object from database selector 218. Feature extractor 220 may further determine a set of select parameters specific to the object based on the metadata of the object using ML model(s) 110. Preferably, the set of select parameters includes first and second sets of parameters for the physical object. Each parameter in the first set of parameters corresponds to information associated with a structure of material of the physical object, and each parameter in the second set of parameters corresponds to information associated with the process of manufacturing the physical object.

In some aspects of the present disclosure, the set of parameters may be associated with micro-structural feature(s) present on the surface of the object and production footprint(s) of the object. For example, when the object to be identified and/or authenticated is a fur coat, the set of parameters may include the length of fur, color gradient of fur, material textures on a fiber attached to the fur, and the like.

In another example, when the object is an automobile gear, the set of parameters may include properties of the material surface of the gear, grooves, or texture(s) on a surface of the gear, and the like. ML model(s) 110 may determine multiple features for the physical object based on the set of parameters (that are specific to the category of the object).

In some aspects of the present disclosure, ML model(s) 110 may be configured as a Convolutional Neural Network (CNN) with multiple feature filters (such as specific feature masks) and pooling layer(s) aligned prior to an Artificial Neural Network. Each feature filter is associated with one feature of the determined multiple features. Feature extractor 220 may determine information from each feature of the multiple features by iteratively training the CNN with a number of image samples captured for the object (i.e., positive training) and a number of image samples captured for other objects (i.e., negative training). Based on the iterative training, the CNN may determine information associated with each feature of the multiple features and assign a weight for each feature filter. CNN may further generate an information score for each feature of the multiple features based on the weight assigned to each feature. Furthermore, CNN may identify a set of features from the multiple features of the object having information score higher than a first information threshold.

In an embodiment, feature extractor 220 may further determine the set of features from each RAW image. Furthermore, feature extractor 220 may determine information in each image based on the associated set of features. Moreover, feature extractor 220 may select one RAW image for determination of analysis area for the object. In some aspects of the present disclosure, the selected RAW image may have highest information of the object. In some other aspects of the present disclosure, the selected RAW image (hereinafter interchangeably referred to as 'RAW image') may have the highest count of feature(s) with an information score higher than the first information threshold.

In some other aspects of the present disclosure, hardware station 102 may further include sensor(s) (not shown) to detect a set of physical parameters of the object such as density of the object, weight of the object, conductivity of the object, etc. Feature extractor 220 may further update the set of features by combining the set of physical parameters of the object with the first and second sets of parameters.

In some aspects of the present disclosure, feature extractor 220 further determine feature density of the set of features in the RAW image. Moreover, the feature extractor generates multiple segments corresponding to the RAW image by segmentation of pixels of the RAW image based on the feature density. In some aspects of the present disclosure, ML model(s) 110 may support feature extractor 220 to generate the multiple segments using data segmentation technique(s). Each segment of the multiple segments may have at least a pre-defined size and at least a pre-defined feature density.

Feature extractor 220 may further identify a set of select features from the set of features having information score higher than a second information threshold which is higher than the first information threshold. The set of select features may be unique features specific to the object. Feature extractor 220 may further identify segment(s) from multiple segments, having at least a pre-defined count of select features. Furthermore, feature extractor 220 may identify a segment of the selected segments as an analysis area for the object. In some aspects of the present disclosure, the analysis area may have the highest count of select features. In some other aspects of the present disclosure, the analysis area may have the highest information compared to other selected patches.

In some other aspects of the present disclosure, feature extractor 220 may compare the count of select features with the pre-defined count of select features. In an exemplary scenario, when multiple segments have select features more than the pre-defined count of select features, feature extractor 220 may generate multiple analysis areas, one corresponding to each segment. Feature extractor 220 may further determine a bounding box (i.e., a boundary enclosing the multiple analysis areas) and may select the bounding box as the analysis area of the object. In some aspects of the present disclosure, feature extractor 220 may utilize the ML model(s) 110 to determine the bounding box.

In another exemplary scenario, when the object has feature density higher than the object threshold (i.e., select features are present throughout the object), feature extractor 220 may determine the bounding box enclosing the entire object in the image(s) as the analysis area.

In response to the identification of the analysis area, template generator 222 may generate a template for the analysis area of the object. Template generator 222 may further compare the analysis area with a real-time image feed (e.g., a live video stream) to assist a user to capture an analysis image of the object for further processing. In an exemplary scenario, the template can be a bounding box that compares the analysis area with the real-time image feed. The bounding box may be configured to represent a match and/or a mismatch of the analysis area with the real-time image feed by changing the color of the bounding box. In another exemplary scenario, the template can be a translucent AR filter for the analysis area. The translucent AR filter can be displayed to the user, overlapping the real-time image feed that directs the user to alter alignment of the object to capture the analysis image. In another exemplary scenario, the template can be navigation notification(s). In such a scenario, template generator 222 is supported by the ML model(s) 110 to determine the relative position of the object with respect to a camera sending the real-time image feed.

For initial physical code generation for the physical object, template generator 222 may further generate a trigger signal for the image capture station 108 that enables RAW image camera(s) 216 to capture the analysis image of the object. For verification of identity or authenticity of the object, template generator 222 generates a trigger signal for user device 104 that enables device camera(s) 120 to capture the analysis image. Preferably, the analysis image is captured using a macro-lens camera with a pixel resolution of at least 800 ppi.

Feature extractor 220 is configured to receive the analysis image and determine values of the set of features present in the analysis image (hereinafter interchangeably referred as 'feature values') and values of the set of select features (hereinafter interchangeably referred to as 'select feature values') from the analysis image. Moreover, feature extractor 220 sends the feature values and the select feature values to code generator 224.

Code generator 224 generates a physical layer of information for the object based on the feature values. In some aspects of the present disclosure, code generator 224 arranges the feature values based on their spatial occurrence in the analysis image. Based on the select values, code generator 224 segregates the physical layer into multiple patches. In an exemplary scenario, each patch may have a length of at least 1 centimeter (cm) and a width of at least 1 cm. In an exemplary scenario, each patch of the multiple patches may have at least ten select features. Code generator 224 further generates a context score for each feature based on the feature values in each patch.

In some aspects of the present disclosure, the set of select features may be selected by feature extractor 220 based on a voting mechanism. The feature extractor 220 may verify the information score of each feature of the set of features based on voting for each feature for the information score. In some aspects of the present disclosure, with an addition of training data of a new object, feature extractor 220 may re-calculate the information score for each feature of the set of features. Feature extractor 220 may further re-identify the select feature(s) based on the re-calculated information score.

In some aspects of the present disclosure, the code generator determines a pattern of features from each patch based on the feature values. Code generator 224 further compares the pattern of features in each patch with other patterns of features in the other patches. Furthermore, code generator 224 identifies unique portion(s) in each pattern of features and determines information associated with each pattern using ML model(s) 110. Based on the information associated with each unique pattern, code generator 224 assigns a weight to each feature.

Code generator 224 further generates the context score for each feature based on the assigned weight. In an exemplary scenario, code generator 224 may utilize a CNN with multiple pattern filters (i.e., masks) and pooling layer(s) aligned prior to an Artificial Neural Network. Each pattern filter is associated with one pattern of the multiple patterns in the physical layer. The CNN is iteratively trained to determine an impact on the information (i.e., context of a feature) for assigning a weight to each feature of the subset of features.

Based on the context score and feature(s) present in each patch of the multiple patches, the code generator determines a transformation function for each patch. Code generator 224 further generates a feature-vector for each patch based on a transformation of the feature(s) of each patch using the associated transformation function. Code generator 224 further combines the analysis image, metadata of the object, template of the object, and the set of feature-vectors to generate a code layer of information for the object. Furthermore, code generator 224 generates a physical code for the object using the code layer. In some aspects of the present disclosure, code generator 224 generates the physical code from the code layer using a hash function. In some other aspects of the present disclosure, the physical code may be generated using the set of feature-vectors for the object. The physical code generated at the time of training is stored in database 114.

Object identifier 226 is configured to compare first physical code (i.e., generated by code generator 224 in response to a request to verify identity, authenticity, or tamper is generated by the user device) to second physical code (i.e., generated by code generator 224 for training and stored in database 114). Object identifier 226 may retrieve the second physical code from database 114 and may compare the second physical code with the generated first physical code. Based on the comparison, object identifier 226 may generate a matching score. Object identifier 226 may further verify identity, authenticity, or tamper of the object based on the matching score.

In an exemplary scenario, object identifier 226 retrieves a first code layer from the first physical code (i.e., generated based on the request) and a second code layer from the second physical code (i.e., retrieved from database 114). Object identifier 226 further extracts a first set of functions (hereinafter interchangeably referred as 'first set of immutable fibers') from the first code layer and a second set of functions (hereinafter interchangeably referred to as 'second set of immutable fibers') from the second code layer. Furthermore, object identifier 226 compares the first and second sets of immutable fibers. Based on the comparison, object identifier 226 identifies matching and mismatching immutable fibers. Object identifier 226 generates the matching score based on a count of matching and mismatching immutable fibers.

In some aspects of the present disclosure, when the matching score is greater than a first matching threshold, object identifier 226 generates a notification for authenticity verification of the object. When the matching score is less than the first matching threshold and greater than a second matching threshold, the object identifier generates a notification for tamper detection on the object, and when the matching score is less than the second matching threshold, the object identifier generates a notification for identification of the counterfeit object.

Database 114 may be configured to store data, instructions (or executable codes), and data associated with multiple features. Examples of database 114 may include, but are not limited to, Read-Only Memory (ROM), a Random-Access Memory (RAM), a flash memory, a removable storage drive, a Hard Disk Drive (HDD), a solid-state memory, a magnetic storage drive, a Programmable Read Only Memory (PROM), an Erasable PROM (EPROM), and/or an Electrically EPROM (EEPROM). In some aspects of the present disclosure, database 114 may include an object data storage 228, a code storage 230, and a feature data storage 232. Object data storage 228 may be configured to store data of the multiple objects (such as images, analysis images, feature-vectors, physical layer, code layer, transformation functions, and physical code etc. of each object). Code storage 230 may be configured to store executable instructions, computer codes and/or logic(s) for station controller 204 to configure various components of hardware station 102. In some aspects of the present disclosure, code storage 230 may further include executable instructions, computer codes and/or logic(s) for various components of hardware station 102 to perform respective operation(s).

Station interface 202 may have hardware circuitry and components that may be configured to receive input(s) and/or display (or present) outputs at the hardware station. Station interface 202 may include a display 234 and an input interface 236. Display 234 may be configured for displaying and/or presenting output(s) to the user of hardware station 102. Examples of display 234 may include, but are not limited to, a digital display, an analog display, a touch screen display, a graphical user interface, a website, a webpage, a keyboard, a mouse, a light pen, an appearance of a desktop, and/or illuminated characters. Aspects of the present disclosure are intended to include or otherwise cover any type of display 234 including known, related art, and/or later developed output interfaces, without deviating from the scope of the present disclosure. Input interface 236 is configured for receiving inputs from a user of the hardware station. Examples of input interface 236 may include, but are not limited to, a touch interface, a mouse, a keyboard, a motion recognition unit, a gesture recognition unit, a voice recognition unit, and the like. Aspects of the present disclosure are intended to include or otherwise cover any type of input interface 236 including known, related art, and/or later developed input interfaces without deviating from the scope of the present disclosure.

Station controller 204 includes hardware circuitry and/or logic that enables configuration of various components of hardware station 102. In some aspects of the present disclosure, station controller 204 may generate signals for sequential, parallel and/or alternate operation of various components of hardware station 102. In some aspects of the present disclosure, upon successful verification of authenticity or identity of an object, station controller 204 may generate a Non-Fungible Token (NFT) corresponding to the object, that can be associated with a digital account of a user of user device 104 and stored in database 114.

Communication controller 206 includes hardware circuitry to enable a network interface 208 to connect to network 106. Network interface 208 may be implemented by use of various known technologies to support wired and/or wireless communication of hardware station 102 with network 106. Examples of network interface 208 may include an antenna, a RF transceiver, amplifier(s), a tuner, oscillators, a digital signal processor, a coder-decoder (CODEC) chipset, a Subscriber Identity Module (SIM) card, a local buffer circuit, and the like.

Data exchange interface 209 may include suitable logic, circuitry, interfaces, and/or computer code that may be configured to receive input(s) and transmit output(s) via multiple data ports (not shown). Data exchange interface 209 may further include various input and output data ports (not shown) for different I/O devices such that a variety of I/O devices (with different and/or specific requirements and configurations) can be coupled to hardware station 102.

Figure 3:
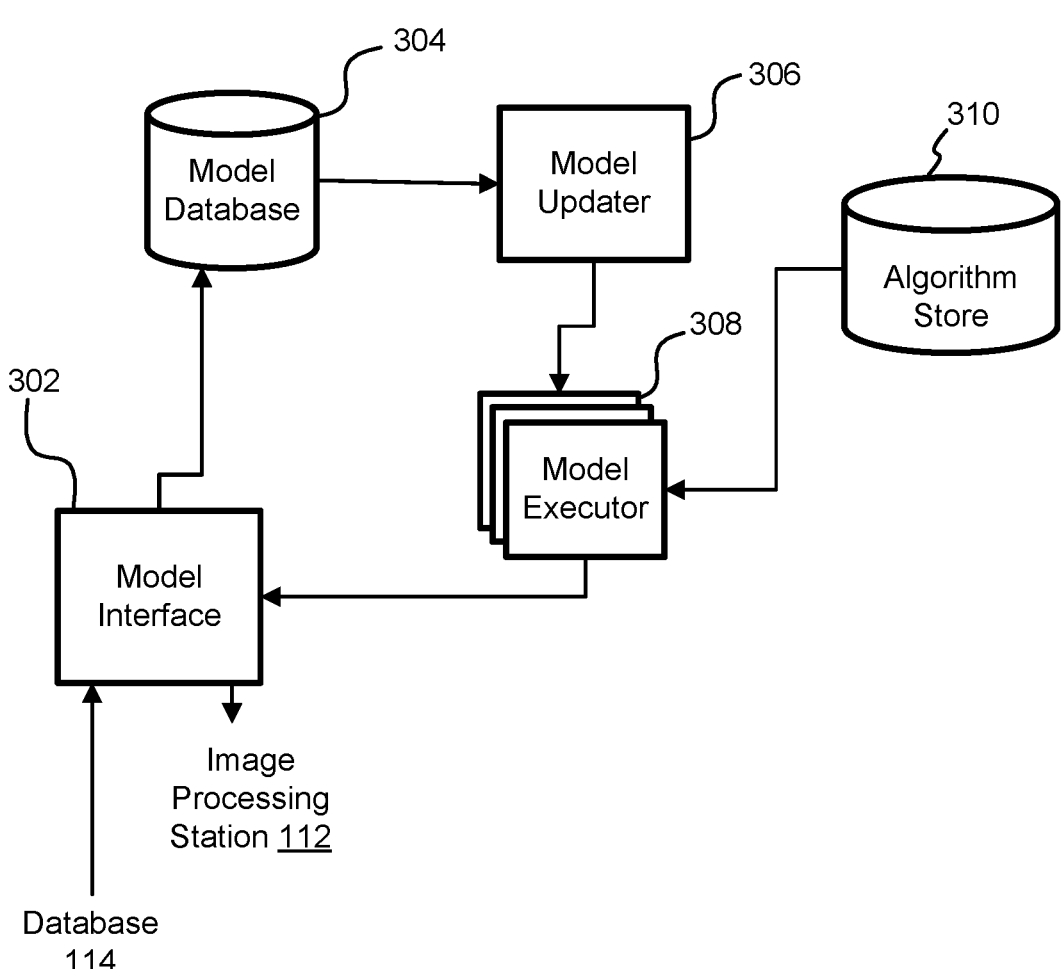
FIG. 3 is a block diagram that depicts a machine learning (ML) model of the hardware station, according to an exemplary embodiment.

FIG. 3 is a block diagram that depicts a machine learning (ML) model 110 of the hardware station, according to an exemplary embodiment. ML model 110 may include a model interface 302, a model database 304, a model updater 306, a model executor 308, and an algorithm store 310.

Model interface 302 receives training data (e.g., features, feature-vectors, object images, and instruction(s) based on the functionality of various components of image processing station 112. Model interface 302 further sends model-generated output(s) (such as weights assigned to feature(s), etc.) to hardware station 102. Model interface 302 further receives feedback data from hardware station 102 and transmits the feedback data to model database 304. Model updater 306 further accesses the feedback data to update parameter(s) (such as weights, bias, number of layers, filters, pooling type etc.) of ML model 110 for training specific to an object of the multiple objects. Additionally, model interface 302 receives the instruction data from hardware station 102 and transmits classified information to image processing station 112.

Model database 304 stores neural networks, weights of neurons for the neural networks, input data for the neural networks, output data from the neural networks, and the like. Additionally, model database 304 transmits a neural network from the stored neural networks to model updater 306. Model database 304 further sends the feedback data to model updater 306. Based on the feedback data, model updater 306 updates the parameters of ML model for customized training specific to each object.

Model executor 308 receives data from model updater 306 that includes a customized training regimen specific to each object and the feedback data. Based on the data received from model updater 306, model executor 308 retrieves ML algorithms from algorithm store 310 to perform an operation for image processing station 112.

In some aspects of the present disclosure, model executor 308 transmits indication of a machine learning algorithm to algorithm store 310. Algorithm store 310 stores multiple machine learning algorithms. Based on the indication, algorithm store 310 transmits the corresponding machine learning algorithm from the multiple machine learning algorithms.

Figure 4:
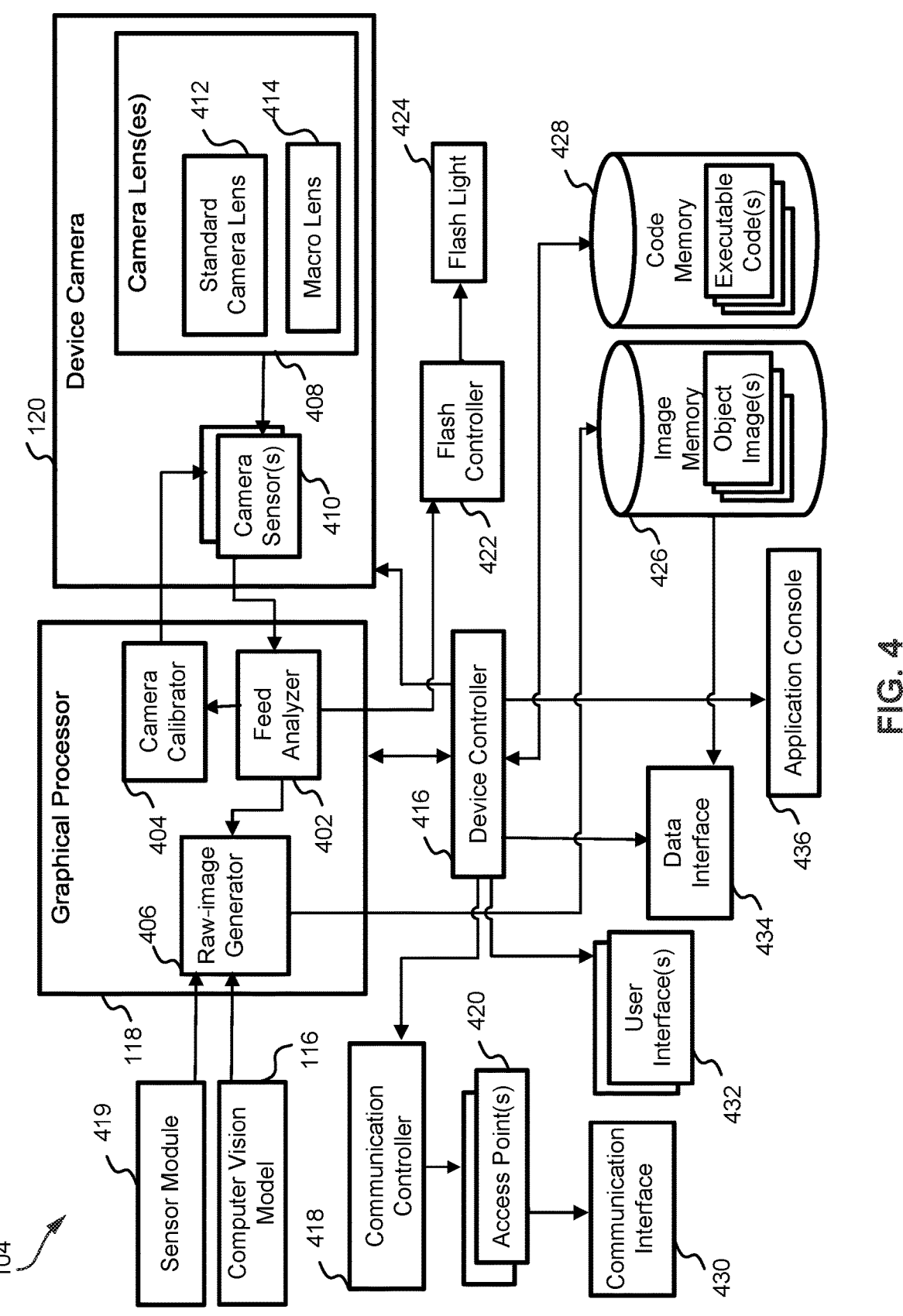
FIG. 4 illustrates a user device of the system, according to an exemplary embodiment.

FIG. 4 illustrates user device 104, according to an exemplary embodiment. User device 104 includes computer vision model 116 supporting graphical processor 118, device camera 120. Graphical processor 118 includes hardware circuitry and logic(s) to perform several image processing operations. Device camera 120 includes hardware circuitry, lenses, and sensors to capture RAW image(s). Preferably, various components of device camera 120 in combination can capture standard image(s) as well as macro image(s) of an object.

Graphical processor 118 may include a feed analyzer 402, a camera calibrator 404, and a RAW image generator 406. Device camera 120 may include camera lens(es) 408 and camera sensor(s) 410. In some aspects of the present disclosure, camera lenses 408 may include a standard lens 412 and a macro lens 414.

User device 104 may further include a device controller 416, a communication controller 418, access point(s) 420, a flash controller 422, a flash light 424, an image memory 426, a code memory 428, a communication interface 430, a user interface 432, a data interface 434, and an application console 436.

Communication controller 418 may include processing circuitry to enable and/or control access point(s) 420. The access point(s) generate wireless communication signals that facilitate communication interface 430 to communicatively couple with network 106. Flash light 424 (hereinafter interchangeably referred to as 'flash 424') includes light source(s) (such as LEDs) that provide artificial light when instructed by flash controller 422.

Camera sensor(s) 410 may be configured to image(s) of an object to be authenticated and/or identified using standard lens 412. Camera sensor(s) 410 may further be configured to capture an analysis image of the object using the macro lens 414. Preferably, camera sensor(s) 410 may be configured to capture the analysis image of the object at a resolution of at least 800 ppi.

Feed analyzer 402 includes image processing circuitry configured to analyze image(s) or the analysis image captured by camera sensor(s) 410. Particularly, feed analyzer 402 determines a noise level (i.e., noise in pixels) using computer vision model 116.

In an exemplary embodiment, computer vision model 116 may be configured as a deep learning model (such as an artificial neural network) that is iteratively trained on a number of image samples corresponding to a variety of different noise levels. The deep learning model is further trained with a number of image samples corresponding to a variety of environmental conditions (such as illumination on an object). Furthermore, the deep learning model is trained on a number of image samples for the multiple object categories or subcategories (i.e., the object type) corresponding to a variety of environmental conditions and a noise level in the associated image sample.

Feed analyzer 402 compares the determined noise level in the image(s) or the analysis image captured by camera sensor(s) 410 with a noise threshold value. In a scenario, when the determined noise level is higher than the noise threshold value, feed analyzer 402 generates a first alert signal for camera calibrator 404. The camera calibrator generates a calibration signal for camera sensor(s) 410 to change calibration parameter(s) of the camera sensor(s) (such as focal length, aperture, etc.). In another exemplary scenario, when feed analyzer 402, using trained computer vision model 116, determines that the determined noise level is higher than the noise threshold value due to insufficient illumination on the object, feed analyzer 402 generates a second alert signal for flash controller 422. In response, flash controller 422 enables flash 424 to provide artificial illumination on the object.

In another scenario, when the determined noise level is higher than the noise threshold value, feed analyzer 402 transmits the image(s) or the analysis image to RAW image generator 406. ML model(s) 110 (i.e., the artificial neural network) may further be trained on multiple images of multiple objects corresponding to a variety of image processing techniques to identify effect(s) of image processing filter(s). RAW image generator 406, using ML model(s) 110, determines whether the image processing filter(s) is/are applied on the image(s) or the analysis image. In response to determining that the processing filter(s) is/are applied on the image(s), RAW image generator 406 may be configured to generate an inverse filter that nullifies the effect(s) of the image processing filter(s).

In some aspects of the present disclosure, when user device 104 receives a template from hardware station 102, device controller 416 generates a trigger instruction for camera sensor(s) 410. In response, camera sensor(s) 410 enable standard lens 412 to capture a real-time video feed. The real time video feed with the template can be presented (or displayed) to a user of user device 104 by user interface 432 in an application interface generated by application console 436 that enables the user of user device 104 to capture the analysis image. Image memory 426 is configured to store the analysis image and data interface 434 is configured to transmit the analysis image to network 106.

In another embodiment, user device 104 may further include sensor module 419. Sensor module 419 may include a set of sensors for determination of the physical parameters of the object. The sensor module 419 may further include a LIDAR sensor. The LIDAR sensor may be configured to generate the second laser beam(s). Being reflected by the object, the second laser beam(s) may generate second point cloud(s). Sensor module 419 may further derive the derive precise information corresponding to the geometry of the object. Furthermore, sensor module 419 may generate RAW image(s) for the object. In some aspects of the present disclosure, to generate the RAW image, RAW image camera(s) 116 may transform the precise information derived from the first point cloud(s) into numeric pixel value(s). Sensing module 419 may further be configured to determine microstructural features from the object using laser interferometry techniques.

The LIDAR in sensing module 419 may further be configured to generate a dense laser beam to capture a scan of the analysis area of the object. Based on the scan, the LIDAR may generate second analysis point cloud(s). Further, sensing module 419 may generate the second analysis image based on the second analysis point cloud(s).

Application console 436 may be configured as a computer-executable application to be executed by device controller 416. Application console 436 may include suitable logic, instructions, and/or codes for executing various operations of user device 104 to access and/or present service(s) of the various data processing components of system 100. The computer-executable application may be controlled by component(s) of the system 100 and may be stored in code memory 428. Aspects of the present disclosure may include or otherwise comprise any type of computer or smart device application including known, related art, and later developed applications, without deviating from the scope of the present disclosure.

In some aspects of the present disclosure, the analysis image and the set of physical parameters of the object may be transmitted to hardware station 102 for further processing using the application console 436.

Figure 5:
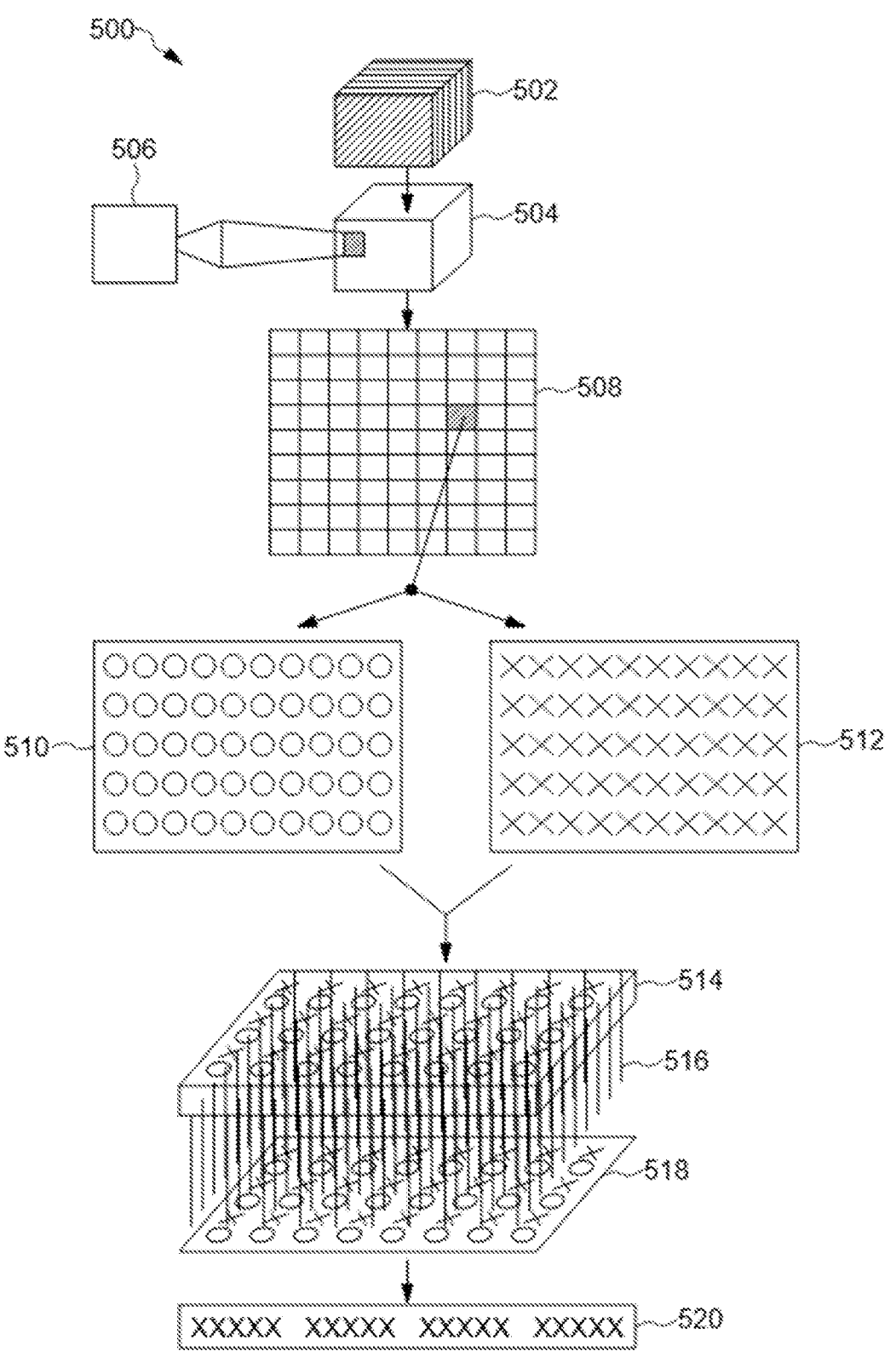
FIG. 5 is a process flow diagram that depicts the generation of a physical code, according to an embodiment.

FIG. 5 is a process flow diagram that depicts a process 500 for the generation of a physical code, according to an embodiment. In some configurations, FIG. 5 refers to multiple images of a physical object, a selected image from the multiple images, an analysis area, multiple patches of the selected image, a set of microstructural parameters, and a set of distinctive manufacturing footprints, a physical layer of information for the physical object, a code layer of information for the physical object, multiple immutable fibers and a physical code for the physical object.

In process 502, image(s) of the physical object are captured. In some aspects of the present disclosure, a real-time video feed is captured for the object.

In process 504, one image of the image(s) is selected by hardware station 102 based on information in the image(s). In some aspects of the present disclosure, a set of features are extracted from each image to determine the information.

In process 506 an analysis area from the selected image is identified. In some aspects of the present disclosure, a feature density is determined from the selected image and the analysis area is selected based on the feature density. Specifically, the selected image may be segmented into multiple segments (with a pre-defined specification) based on the feature density and a segment of the multiple segments is selected as the analysis area.

In process 508, an analysis image is captured corresponding to the analysis area. In some aspects of the present disclosure, the analysis image is captured based on a template of the object generated by hardware station 102. The analysis image is further segregated into a multiple patches. In some aspects of the present disclosure, a set of select features are determined from the analysis area based on information associated with each feature in the analysis area. Each patch may have at least a pre-defined size and at least a pre-defined count of select features.

In process 510, the first set of features that are associated with the set of microstructural parameters are determined from each patch.

In process 512, the second set of features that are associated with the set of distinctive manufacturing footprints are determined from each patch.

In process 514, the physical layer of information is generated using the first and second set of features. The physical layer has the first and second sets of features combined for each pixel.

In process 516, one immutable fiber is generated for each patch. The immutable fiber corresponds to a transformation function for each patch, that is dependent on the first and second sets of features in each patch.

In process 518, a set of feature-vectors are generated from the physical layer based on the immutable fibers. Moreover, a code layer of information is generated based on the physical layer and the immutable fibers. In some aspects of the present disclosure, the code layer includes the template, the analysis image, metadata, and feature-vectors associated with the object.

In process 520, a physical code is generated using the code layer. In some aspects of the present disclosure, the physical code may be generated from the code layer using a hash function.

Figure 6A:
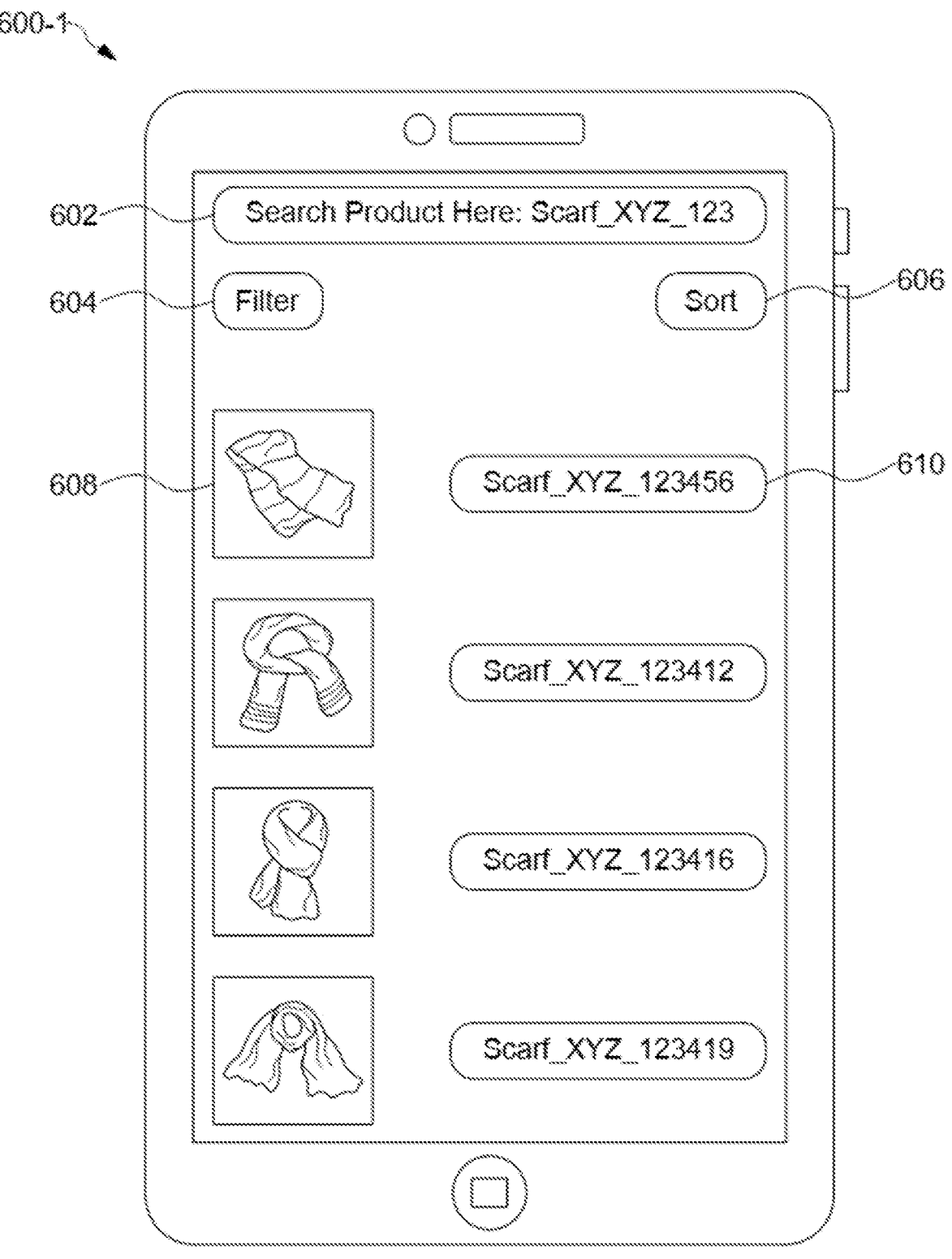
FIGS. 6A-6B illustrate example embodiments of an application interface generated by the system.

FIG. 6A illustrates an example embodiment of an application interface 600-1 generated by system 100. Application interface 600-1 is a computer-generated application associated with operation(s) of image processing station 112 of hardware station 102. The application is hosted by application console 436 and displayed to the user of user device 104 on user interface 432. Application interface 600-1 includes elements 602-610.

Element 602 indicates an option to categorize a physical object. Element 602 enables the user of user device 104 to provide specific details (such as metadata) of the object.

Element 604 indicates an option to filter a category of physical objects. Element 604 enables the user of user device 104 to provide input(s) for selection of a category or type of object.

Element 606 indicates an option to sort results displayed on application interface 600-1 by hardware station 102 based on pre-defined filter(s) (e.g., sort by relevance, price, rating, date, etc.). Element 606 enables the user of user device 104 to provide input(s) to sort the results based on the selected filter.

Element 608 indicates an object displayed on application interface 600-1 based on the input(s) provided by the user of user device 104 in elements 602, 604, or 606.

Element 610 indicates an identifier (such as a name tag) associated with the object displayed at element 608.

In some aspects of the present disclosure, each element of elements 602-610 are selectable by the user of user device 104, and upon selection of element 608 or element 610, after input(s) provided to elements 602, 604, or 606, the application renders another application interface on user interface 432.

Figure 6B:
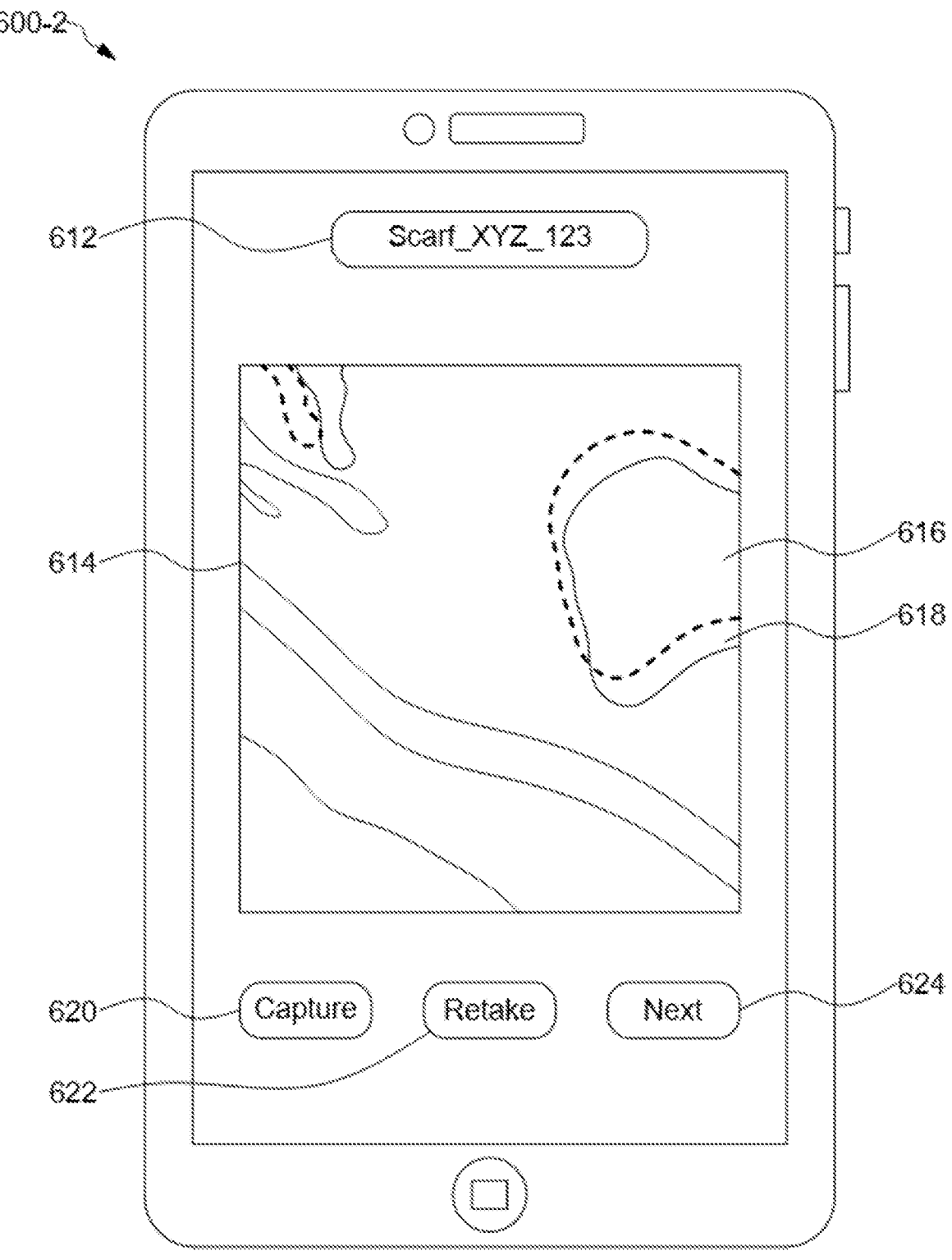

FIG. 6B illustrates an example embodiment of an application interface 600-2 generated by system 100. Application interface 600-2 is a computer-generated application associated with operation(s) of image processing station 112 of hardware station 102. The application is hosted by application console 436 and displayed to the user of user device 104 on user interface 432. Application interface 600-2 includes elements 612-624.

Element 612 indicates an identifier (such as the name tag) associated with an object selected by the user of user device 104. Element 602 enables the user of user device 104 to view the identifier associated with the selected object.

Element 614 indicates a template for analysis image generated by image processing station 112 corresponding to the selected object.

Element 616 indicates a feature of the template selected by the user of user device 104. Element 616 enables the user of user device 104 to change the alignment of the user device to capture an analysis image.

Element 618 indicates a feature of the video feed captured by user device 104. Element 618 enables the user of user device 104 to adjust the alignment of the user device based on a visual comparison of the template presented in element 616 and the video feed presented in the element 618.

Element 620 indicates an option to capture an analysis image for the selected object. Element 620 enables the user of user device 104 to capture the analysis image of the selected object when the video feed in element 618 matches with the template in element 616.

Element 622 indicates an option to recapture (or retake) the analysis image. Element 522 enables the user of user device 104 to re-capture the analysis image when the analysis image is captured mismatching the template.

Element 624 indicates an option to submit the analysis image for further processing. Element 624 enables the user of user device 104 to confirm a selection of the analysis image.

In some aspects of the present disclosure, and upon selection of element 624 subsequent to element 620 or element 622, the application renders another application interface on user interface 432.

Figure 7:
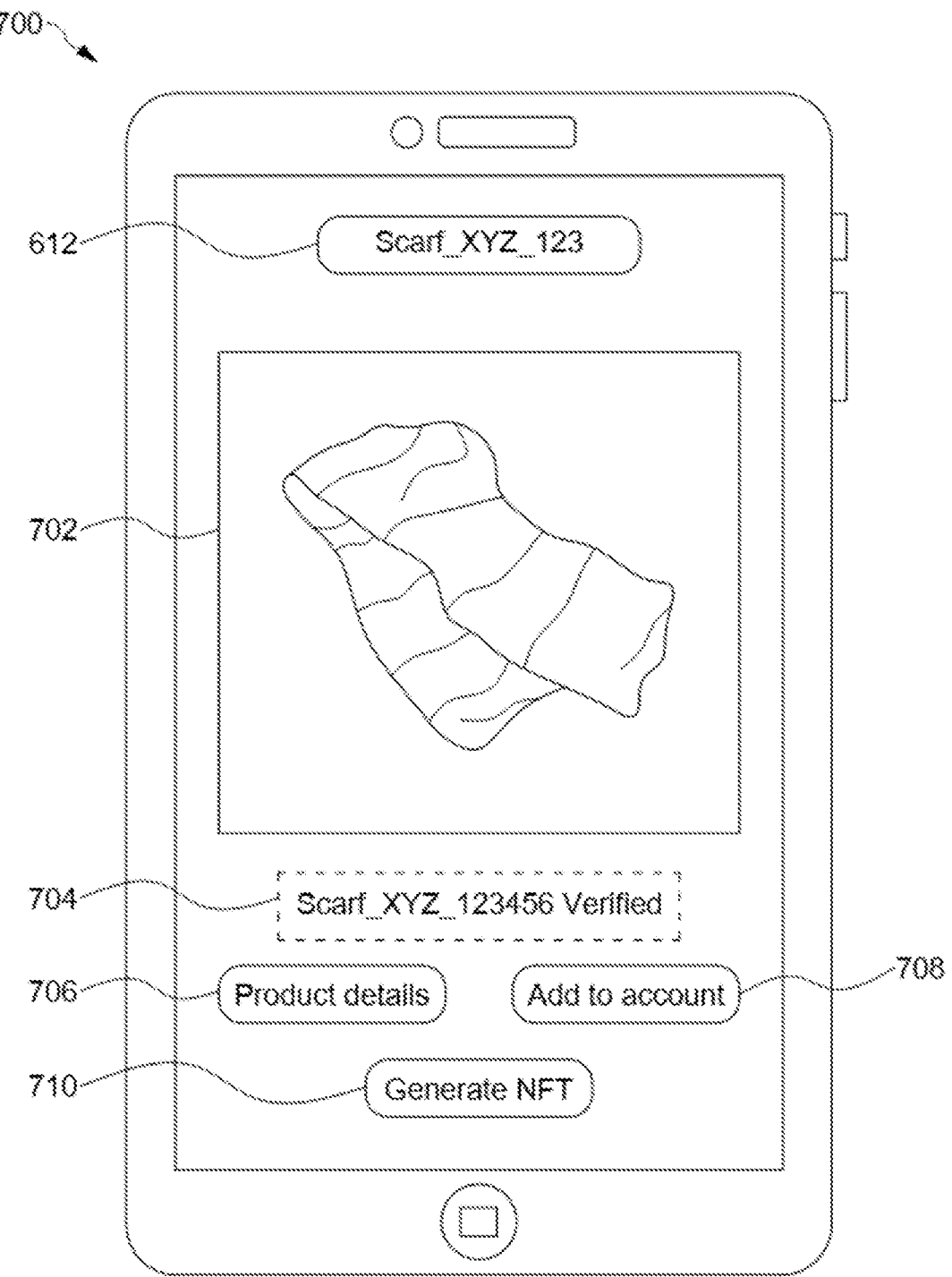
FIG. 7 illustrates an example embodiment of an application interface generated by the system.

FIG. 7 illustrates an example embodiment of an application interface 700 generated by system 100. Application interface 700 is a computer-generated application associated with operation(s) of image processing station 112 of hardware station 102. The application is hosted by application console 436 and displayed to the user of user device 104 on user interface 432. Application interface 700 includes elements 612, 702-710.

Element 702 indicates an identified object based on the captured analysis image. Element 702 enables the user of the user device to view an object identified by the hardware station corresponding to the analysis image captured by user device 104.

Element 704 indicates a status of authenticity of the object based on the analysis image. Element 704 enables the user of user device 104 to view the status of authenticity of the selected object based on the analysis image.

Element 706 indicates an option to view details (such as metadata, image(s), or specifications of the object stored in database 114). Element 706 enables the user of user device 104 to view details associated with the object stored in database 114.

Element 708 indicates an option to add the product to a digital account associated with the user of user device 104. Element 708 enables the user to add the verified product to be added as a digital asset to the digital account of the user of user device 104. This facilitates the user of user device 104 to revisit anytime later and access details of the digital asset(s) owned by the user of user device 104.

Element 710 indicates an option to generate a Non-Fungible Token (NFT) for the verified object, that can be stored in the digital account of the user. The NFT may include the product details of the object stored in database 114 in an encrypted form. Element 710 enables the user of user device 104 to generate the NFT corresponding to the verified product that can be accessed anytime later.

In some aspects of the present disclosure, and upon selection of elements 708 or 710, the application renders another application interface on user interface 432.

Figure 8A:
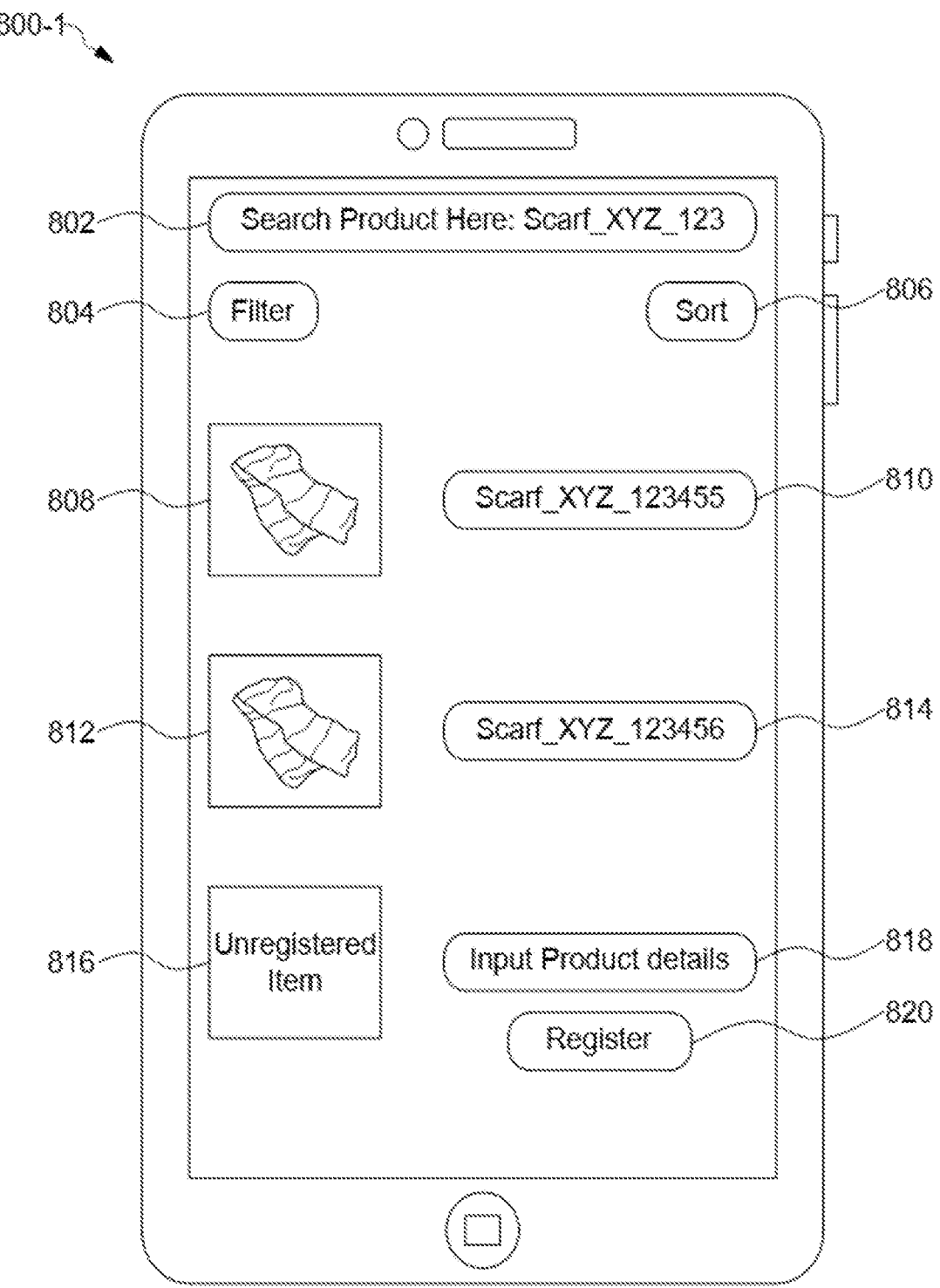
FIGS. 8A-8B illustrate example embodiments of an application interface generated by the system.

FIG. 8A illustrates an example embodiment of an application interface 800-1 generated by system 100. Application interface 800-1 is a computer-generated application associated with operation(s) of image processing station 112 of hardware station 102. The application is hosted by application console 436 and displayed to the user of user device 104 on user interface 432. Application interface 800-1 includes elements 802-820.

Element 802 indicates an option to provide input(s) for registering a batch of identical items. Element 802 enables the user of user device 104 to provide a batch identifier (or a batch tag) to the batch of identical items.

Element 804 indicates an option to provide input(s) to filter a category for the batch of identical items. Element 804 enables the user of user device 104 to provide input(s) to select the category for the batch of the identical items based on a set of pre-defined category filters.

element 806 indicates an option to sort the category of the batch of identical items. Element 804 enables the user of user device 104 to provide input(s) to sort the category for the batch of the identical in a pre-defined set of ways.

Elements 808 and 812 indicate registered objects of the batch of identical objects. Elements 810 and 814 indicate identifiers for the registered objects presented in elements 808 and 812, respectively. The identical object is registered by submitting an analysis image and providing input(s) corresponding to the metadata of the identical object.

Element 816 indicates an unregistered identical object.

Element 818 indicates an option to provide details of an unregistered identical object. Element 818 enables the user of user device 104 to provide details of the unregistered identical object. The input(s) may include an analysis image and metadata of the unregistered object.

Element 820 indicates an option to provide input(s) to register an unregistered object based on the input(s) provided at element 818.

In some aspects of the present disclosure, a count of identical objects in the batch may be selected by the user of user device 104, based on which a number of registration elements such as elements 802-820 are generated on application interface 800-1. In some aspects of the present disclosure, when all the identical objects in the batch are registered, the application renders another application interface on user interface 432.

Figure 8B:
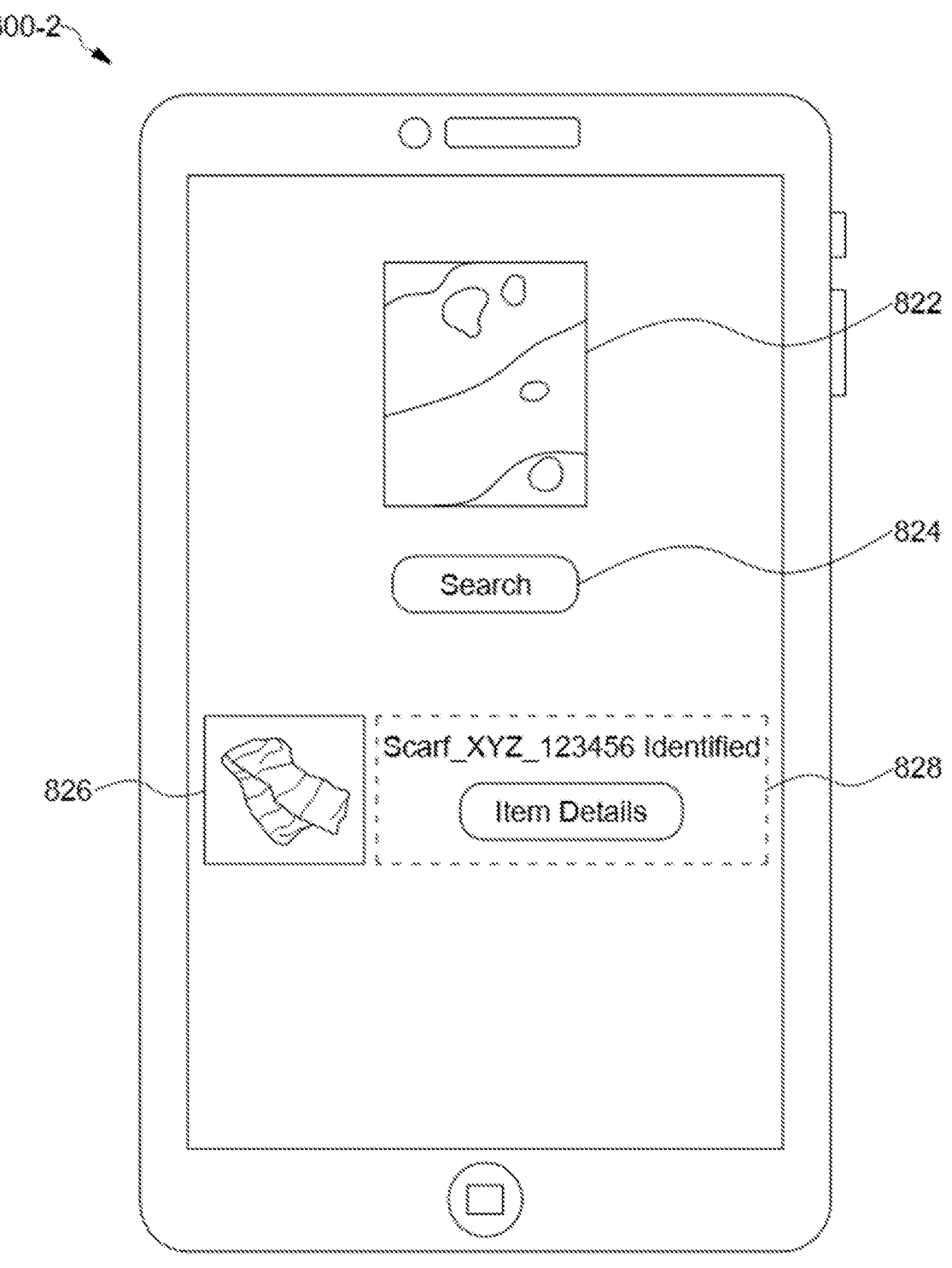

FIG. 8B illustrates an example embodiment of an application interface 800-2 generated by system 100. Application interface 800-2 is a computer-generated application associated with operation(s) of image processing station 112 of hardware station 102. The application is hosted by application console 436 and displayed to the user of user device 104 on user interface 432. Application interface 800-2 includes elements 822-828.

Element 822 indicates an option to capture an analysis image captured for one identical object of the batch of the identical objects. Element 822 enables the user of user device 104 to capture the analysis image for identification of the identical object from the batch of identical objects.

Element 824 indicates an option to analyze the analysis image. Element 824 enables the user of user device 104 to submit the analysis image for identification by hardware station 102.

Element 826 indicates an object identified corresponding to the submitted analysis image.

Element 828 indicates the status of identity of the identical object. Element 828 further indicates an option to view details of the identified object. Element 828 enables the user of user device 104 to view details of the identified identical object, that are stored in database 114.

Figure 9:
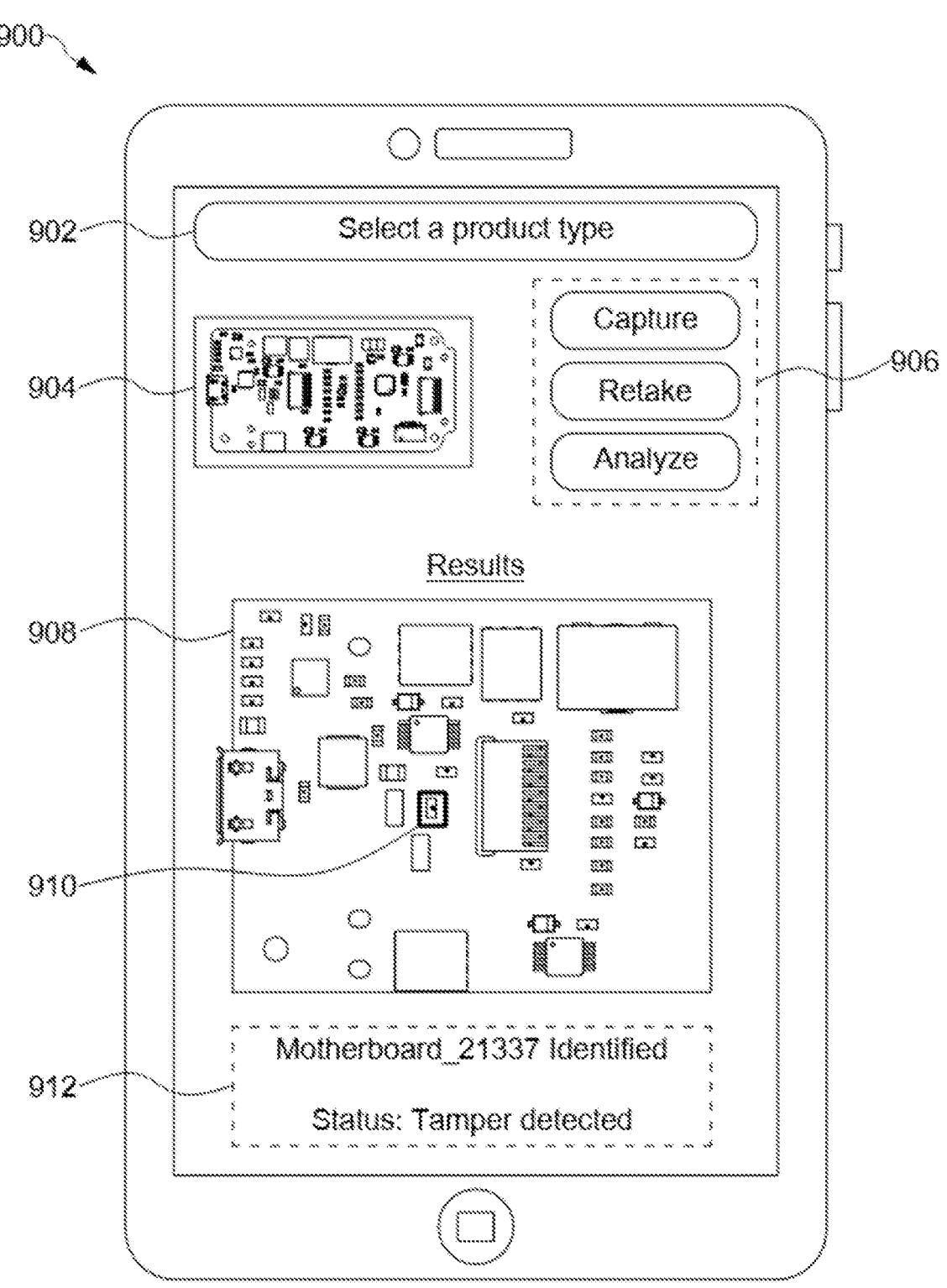
FIG. 9 illustrates an example embodiment of an application interface generated by the system.

FIG. 9 illustrates an example embodiment of an application interface 900 generated by system 100. Application interface 900 is a computer-generated application associated with operation(s) of image processing station 112 of hardware station 102. The application is hosted by application console 436 and displayed to the user of user device 104 on user interface 432. Application interface 900 includes elements 902-912.

Element 902 indicates an option to select a product type for identification of a status of the product. Element 902 enables the user of user device 104 to provide input(s) for selection of the product type for categorization of the product or for selection of a specific product.

Element 904 indicates an option to enable a live video feed from user device 104. Element 906 indicates options to capture and analyze the analysis image from the live feed. Element 906 enables the user of user device 104 to capture, re-capture and/or submit the analysis image to hardware station 102 for analysis.

Element 908 indicates an identified object based on the analysis image. Element 910 indicates a portion of the identified object, where a tamper is detected. Elements 908 and 910 enable the user to view a tampered portion on the identified object.

Element 912 indicates an identity and a tamper status of the identified object. Element 912 enables the user to identify the object and determine the status of tamper of the object.

Figure 10:
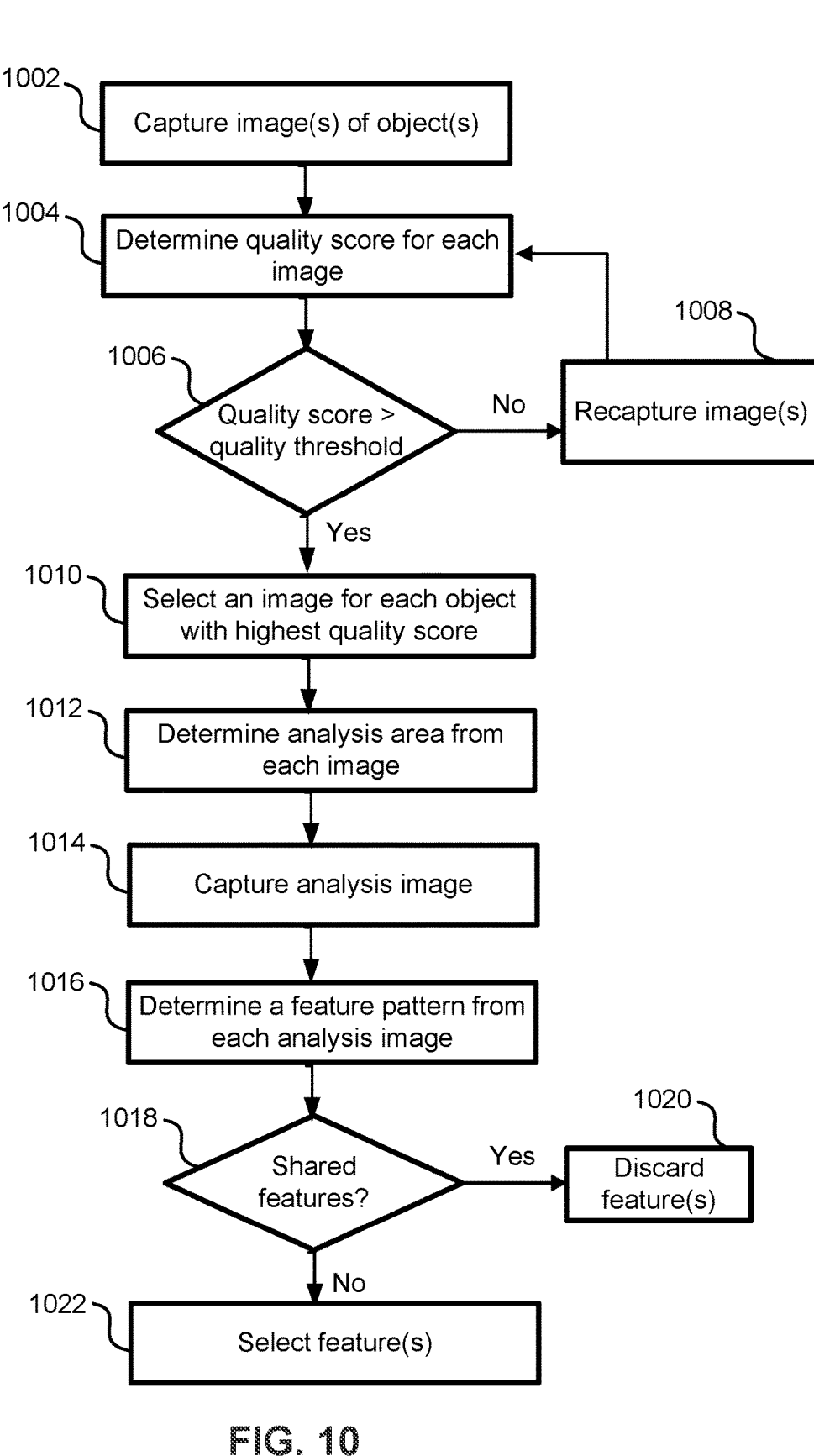
FIG. 10 is a flowchart that depicts a process for selecting feature(s) for a physical object, according to an exemplary embodiment.

FIG. 10 is a flowchart that depicts a process 1000 for selecting feature(s) for a physical object, according to an exemplary embodiment.

At block 1002, multiple images of the object is captured. In some aspects of the present disclosure, each of the captured images is a RAW image (i.e., an unprocessed image). In other aspects of the present disclosure, each captured image is analyzed to identify image processing filter(s) using a deep-learning model. In a scenario, when an image is detected to be processed by image processing filter(s), a reverse filter is generated to generate a RAW image corresponding to the processed image.

At block 1004, a quality score is determined for each captured image. In some aspects of the present disclosure, a set of select parameters may be identified specific to the object, based on an object type. The set of select parameters includes a first set of parameters that are associated with the structure of material of the object and a second set of parameters that are associated with a process of manufacturing the object. Further, multiple features are determined based on the set of select parameters. Furthermore, each feature is assigned a weight using ML models 110. An information score is generated for each feature using the assigned weight. Moreover, the information is determined for each image based on a weighted sum of each feature of the multiple features in each image. The quality score is generated for each image based on the information in each image.

At block 1006, the quality score of each image is compared with a quality threshold value. When the quality score(s) of image(s) is/are determined to be higher than the quality threshold, the process proceeds to block 1010. Else when the quality score(s) of image(s) is/are determined to be lower than or equal to the quality threshold, the process proceeds to block 1008.

At block 1008, when the quality score(s) of image(s) is/are determined to be less than the quality score, another RAW image is captured corresponding to the image(s) with quality score(s) less than the quality threshold and the process loops back to block 1004. The loop continues for a pre-defined count of iterations and discards the image(s) having the quality score below the quality threshold after the pre-defined count of iterations.

At block 1010, when the quality score is more than the quality threshold, one RAW image is selected. In some aspects of the present disclosure, an image having the highest quality score among the other images having quality scores higher than the quality scores is selected.

At block 1012, a first analysis area is determined from the selected RAW image.

At block 1014, a first analysis image is captured corresponding to the first analysis area. In some aspects of the present disclosure, a template corresponding to the first analysis area is generated, that aids in capturing the analysis image. Preferably the first analysis image is a macro-image with a pixel resolution of at least 800 ppi. In some aspects of the present disclosure, the first analysis image is captured using a macro-lens.

At block 1016, a first feature pattern is determined from the first analysis image by image processing station 112. In some aspects of the present disclosure, ML model(s) 110 are trained to determine feature pattern(s) from occurrence of a first set of features in the analysis image. The first set of features are selected by the ML model(s) 110 based on the object type determined through the received categorization input(s). Image processing station 112 utilizes ML model(s) to determine the first feature pattern from the first analysis image.

At block 1018, another set of features corresponding to other object(s) is determined by image processing station

112 using the ML model(s). Based on a comparison of the set of features for the object with the other sets of features corresponding to the other objects, a set of common features is identified from the set of features by image processing station 112.

At block 1020, the shared feature(s) from the first set of features are discarded by image processing station 112.

At block 1022, the remaining feature(s) of the first set of features (i.e., excluding the shared feature(s) are selected as first select feature(s) by image processing station 112.

Figure 11:
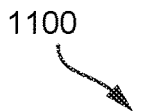
FIG. 11 is a flowchart that depicts a process for determining an analysis area of a physical object, according to an exemplary embodiment.
Figure 11:
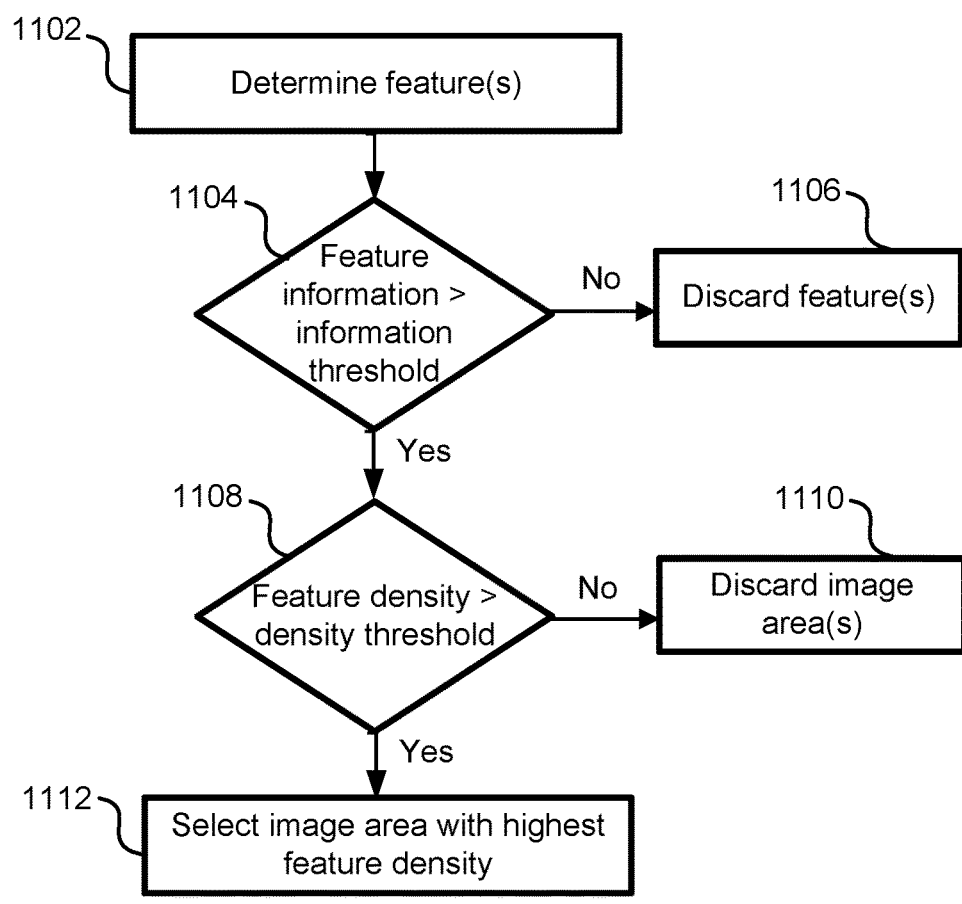

FIG. 11 is a flowchart that depicts a process 1100 for determining the analysis area of the physical object, according to an exemplary embodiment.

At block 1102, multiple features are determined from the RAW image by image processing station 112 from a selected image of the object.

At block 1104, information from each feature is determined by image processing station 112. The information of each feature is further compared with an information threshold. At block 1106, feature(s) having feature information below the information threshold is/are discarded and the remaining feature(s) is/are identified as the set of features.

At block 1108, a density of the set of features in the image is determined by image processing station 112. The raw image is further segregated into multiple segments. At block 1110, segment(s) having feature density less than the density threshold is/are discarded. At step 1112, a segment from the multiple segments, that has highest feature density is selected by image processing station 112 as the analysis area.

Figure 12:
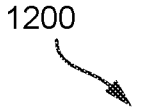
FIG. 12 is a flowchart that depicts a process for generating a physical code for a physical object, according to an exemplary embodiment.
Figure 12:
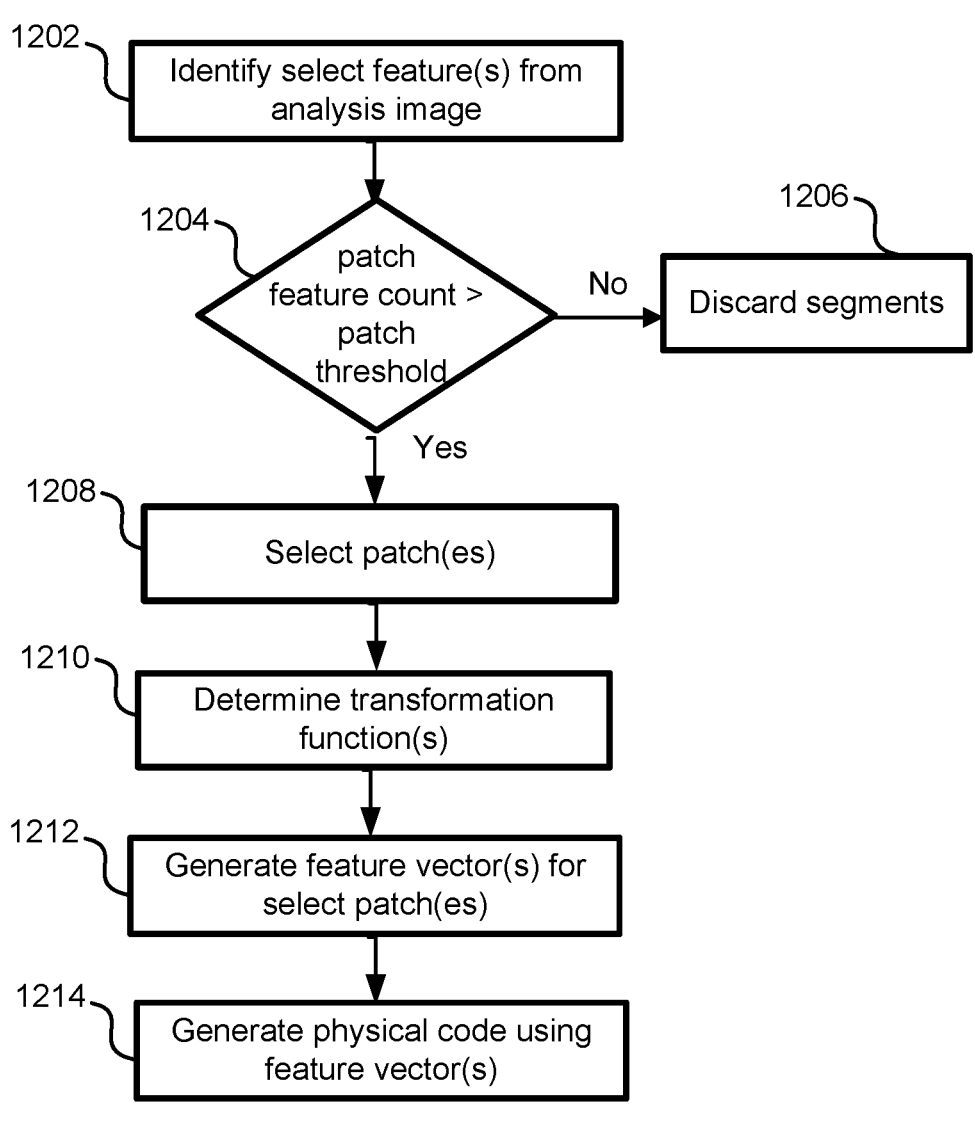

FIG. 12 is a flowchart that depicts a process 1200 for generating a physical code for the physical object, according to an exemplary embodiment.

At block 1202, a set of select features are identified from the analysis image by the image processing station 112.

At block 1204, based on the select features, the analysis image is segregated into multiple patches. In some aspects of the present disclosure, each patch may have a length of at least 1 cm and a width of at least 1 cm. Further, a count of select features in each patch is determined image by image processing station 112. Patch(es) having select feature count less than or equal to a pre-defined patch threshold are discarded at block 1206. Patch(es) having select feature count above the patch threshold is/are identified as select patch(es) image by image processing station 112 at block 1208. In some aspects of the present disclosure, the patch threshold is equal to ten.

At block 1210, a transformation function (i.e., immutable fiber) is determined for each patch by image processing station 112 using ML model(s) 110. The transformation function is specific to the set of select features in each patch.

At block 1212, a feature-vector is generated for each patch. In some aspects of the present disclosure, a code layer is further generated for the object. The code layer includes the set of feature-vectors, image(s), metadata, and template for the object.

At block 1214, the physical code is generated using the set of feature-vectors. In some aspects of the present disclosure, image processing station 112 generates the physical code for the object using an encoding (or encryption) technique such as a data hashing technique.

Figure 13:
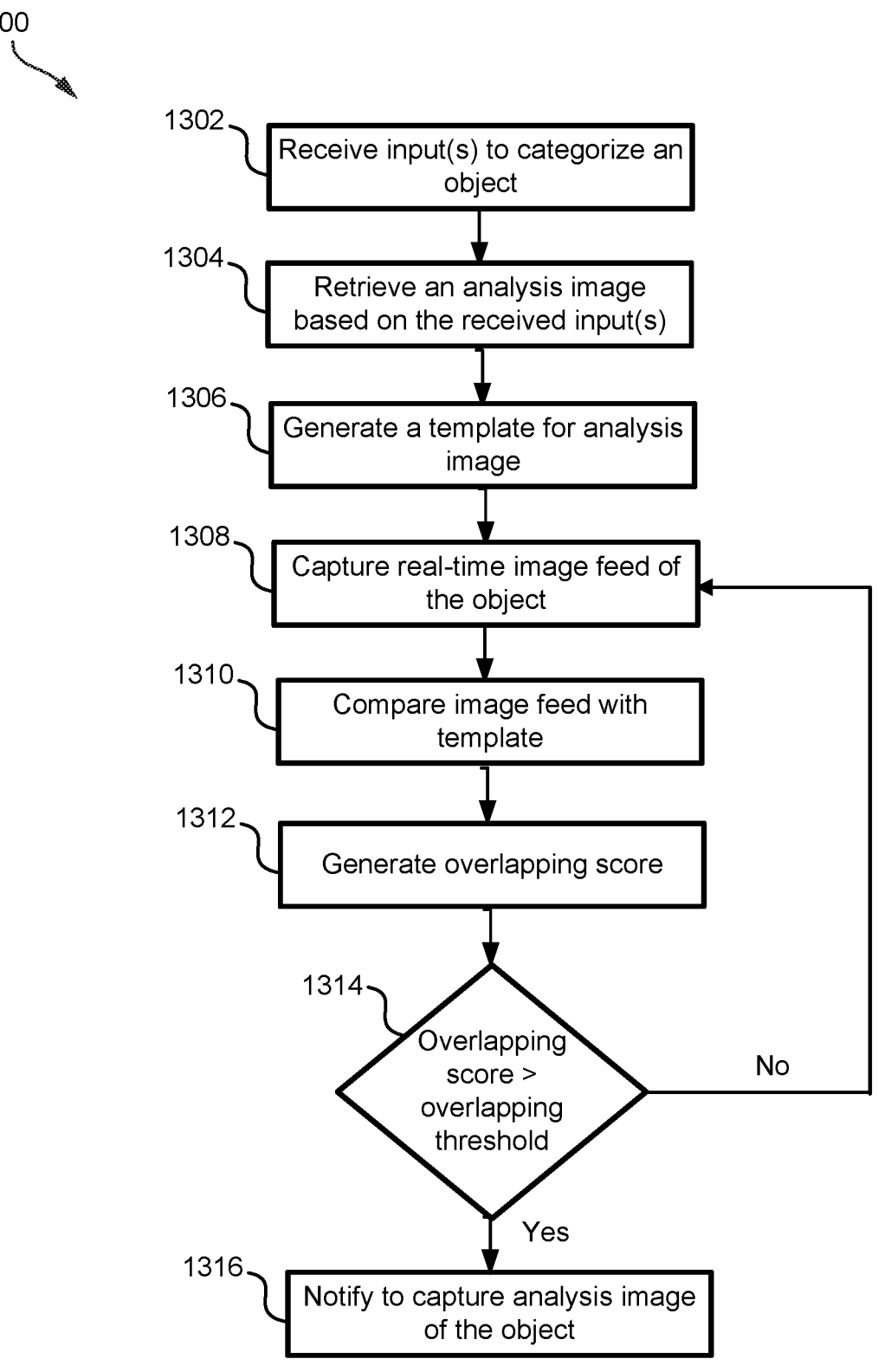
FIG. 13 is a flowchart that depicts a process for aligning a physical object, according to an exemplary embodiment.

FIG. 13 is a flowchart that depicts a process 1300 for aligning of the physical object, according to an exemplary embodiment.

At block 1302, input(s) to categorize (i.e., categorization input(s)) the physical object are received by image processing station 112. The categorization input(s) enable selection of a specific portion of database 114 associated with the physical object corresponding to the input(s).

At block 1304, a second analysis image is retrieved by image processing station 112 from the specific portion of database 114. In some aspects of the present disclosure, the image processing station 108 determines the second analysis image based on a second set of features and a second set of select features at the time of training the ML model(s) 110 for the object.

At block 1306, a template (e.g., a translucent digital filter) is retrieved corresponding to the analysis image from database 114. The template may further include select feature(s) of the second analysis image. In some aspects of the present disclosure, the template is generated by the data processing station 108 at the time of training the ML model(s) 110 for the object. The template is then stored in database 114 to be used for testing (i.e., identification or authentication of the object).

At block 1308, a real-time image feed (e.g., a video feed) is captured by user device 104. The video feed along with the template is presented on user interface 432 of user device 104.

At block 1310, the video feed is compared with the template.

At block 1312, based on the comparison of the video feed with the template, the image processing station generates an overlapping score.

At block 1314, the overlapping score is compared with an overlapping threshold. When the overlapping score is less than or equal to the overlapping threshold, process 1300 loops back to block 1308 and continues to capture the real-time image feed. Else when the overlapping score is higher than the overlapping threshold, process 1300 proceeds to block 1316.

At block 1316, a notification to capture the analysis image is generated. The notification can be displayed on user interface 432 that enables the user of user device 104 to capture the analysis image of the physical object. In some aspects of the present disclosure, the notification can be generated on an Augmented Reality (AR) interface of user device 104.

Figure 14:
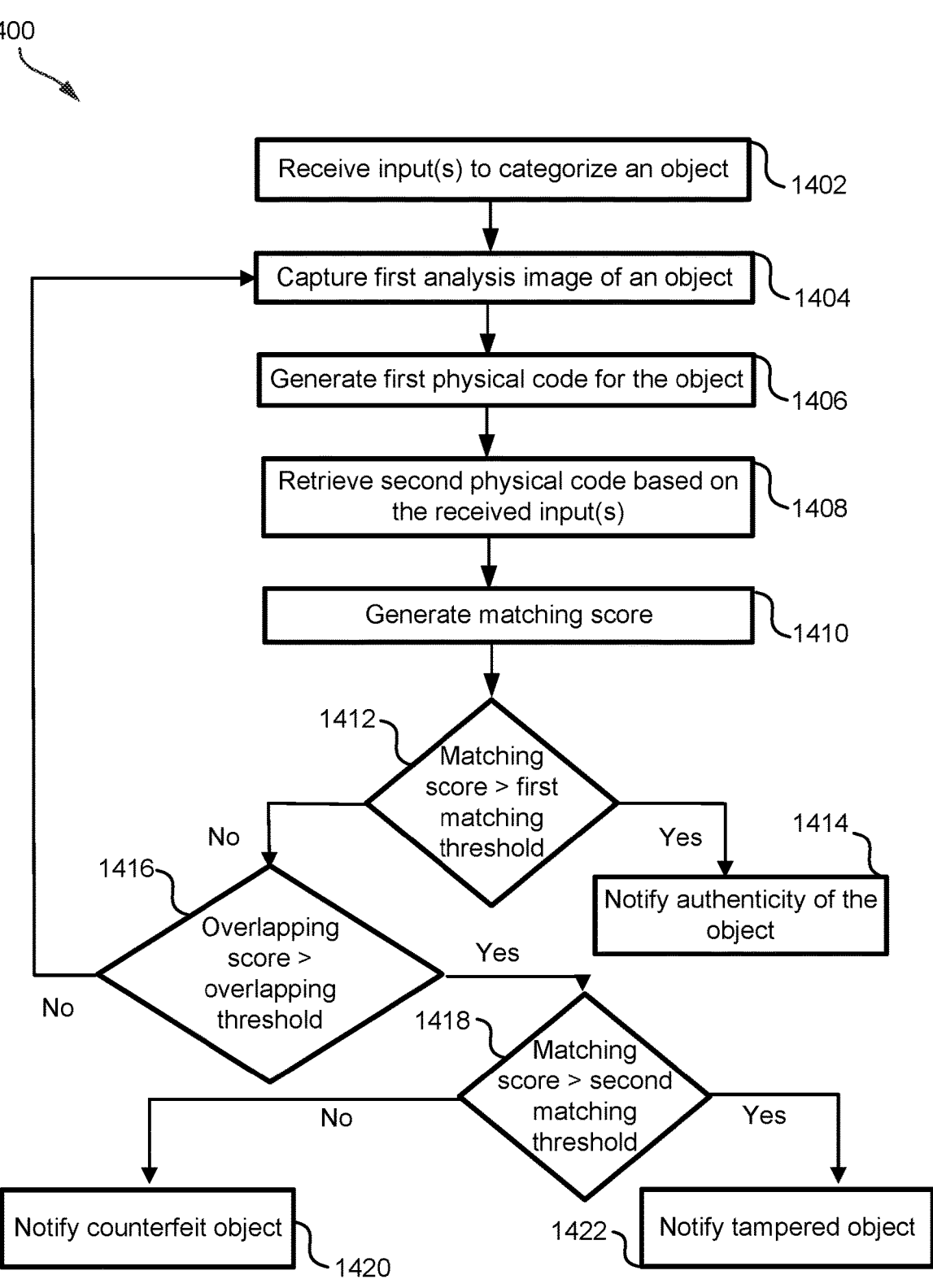
FIG. 14 is a flowchart that depicts a process for authenticating a physical object, according to an exemplary embodiment.

FIG. 14 is a flowchart that depicts a process 1400 for authenticating a physical object, according to an exemplary embodiment.

At block 1402, input(s) to categorize the object (i.e., categorization input(s)) are received at the hardware station 102.

At block 1404, a first analysis image of the object is captured by image capture station 108.

At block 1406, a first physical code is generated by image processing station 112 based on the captured first analysis image.

At block 1408, a second physical code is retrieved from database 114 based on the categorization input(s) of the object.

At block 1410, a matching score is generated based on a comparison of the first physical code and the second physical cal code by the image processing station. In some aspects of the present disclosure, a first set of feature-vectors (i.e., associated with the first physical code) are compared with a second set of feature-vectors associated with the retrieved second physical code to generate the matching score. In some other aspects of the present disclosure, a first set of functions (i.e., the immutable fibers or the transformation functions) associated with the generated first physical code are compared with a second set of functions (i.e., immutable fibers or transformation function) associated with the retrieved second physical code to generate the matching score.

At block 1412, the matching score is compared with a first matching threshold. When the matching score is greater than the first threshold, process 1400 proceeds to block 1414, else when the matching score is less than or equal to the matching threshold, process 1400 proceeds to block 1416.

At block 1414, the hardware station 104 generates a notification associated with a status for machine authentication of the physical object for user device 104 to display "verification of authenticity" to the user of user device 104.

At block 1416, the overlapping score is compared with the overlapping threshold by image processing station 112. When the overlapping score is less than or equal to the overlapping score, process 1400 loops back to block 1404. The loop continues for a pre-defined count of iterations and reports an error when repeated otherwise and stops. Else when the overlapping score is higher than the overlapping threshold, process 1400 proceeds to block 1418.

At block 1418, the matching score is further compared to a second matching threshold by image processing station 112. When the matching score is less than or equal to the second threshold, process 1400 proceeds to block 1420; else when the matching score is greater than the second matching threshold, process 1400 proceeds to block 1422.

At block 1420, image processing station 112 generates a notification associated with a status for machine authentication of the physical object for user device 104 to display a status of "the counterfeit object".

At block 1422, image processing station 112 generates a notification associated with a status for machine authentication of the physical object for user device 104 to display a status of "tampering on the object". In some aspects of the present disclosure, image processing station 112 may further compare first set of features (i.e., associated with the first physical code) with a second set of features (i.e., associated with the second physical code retrieved from database 114) to determine the status of machine authentication of the physical object. The site of tamper can further be displayed on user interface 432 of user device 104.

Figure 15:
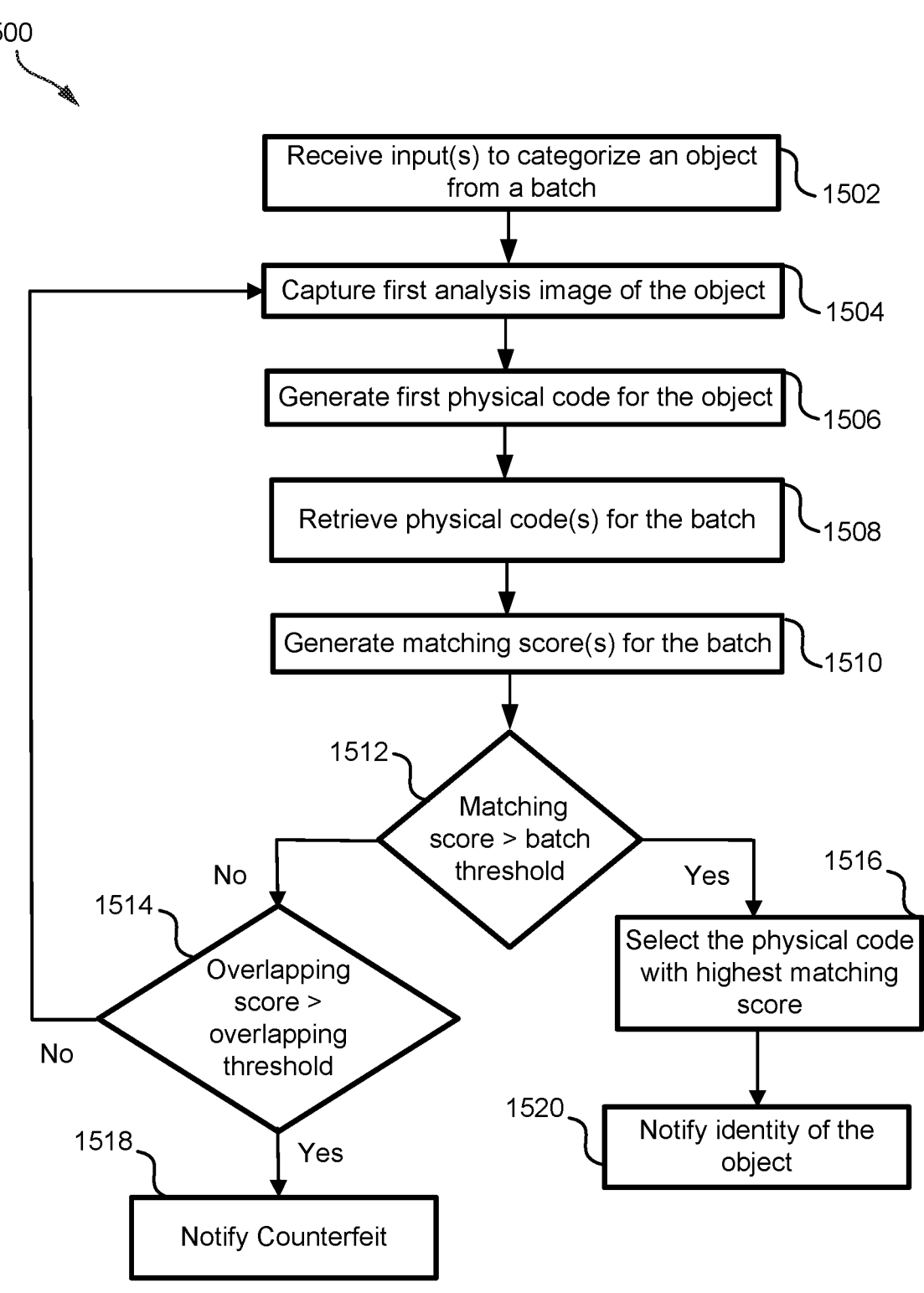
FIG. 15 is a flowchart that depicts a process for identifying a physical object from a batch of physical objects, according to an exemplary embodiment.

FIG. 15 is a flowchart that depicts a process 1500 for identifying a physical object from a batch of identical physical objects, according to an exemplary embodiment.

At block 1502, input(s) to categorize the object (i.e., categorization input(s)) from the batch of identical objects are received at hardware station 102.

At block 1504, the first analysis image of the object is captured by image capture station 108.

At block 1506, a first physical code is generated by image processing station 112 based on the captured first analysis image.

At block 1508, a set of physical codes associated with the batch of identical objects is retrieved from the database based on the input(s) to categorize the object. Each physical code of the set of physical codes is generated based on second set(s) of features, second set(s) of select features, second feature-vector(s), second sets of functions determined by the image processing station 112 at a time of training the ML model(s) 110 for the batch of objects.

At block 1510, a matching score is generated for each batch physical code based on a comparison of the first physical code and each of the batch physical code by the image processing station 112. In some aspects of the present disclosure, a first set of feature-vectors associated with the generated physical code is compared with another sets of feature-vectors associated with the retrieved batch physical code to generate the matching score. In some other aspects of the present disclosure, a first set of functions (i.e., immutable fibers or transformation functions) associated with the generated first physical code are compared with another sets of transformation functions associated with the retrieved batch physical code to generate the matching score.

At block 1512, the matching score is compared with a batch threshold. When the matching score is greater than the first threshold, process 1500 proceeds to block 1516, else when the matching score is less than or equal to the batch threshold, process 1500 proceeds to block 1514.

At block 1514, the overlapping score is compared with the overlapping threshold. When the overlapping score is less than or equal to the overlapping score, process 1500 loops back to block 1504. The loop continues for a pre-defined count of iterations and reports an error when repeated otherwise and stops. Else when the overlapping score is higher than the overlapping threshold, process 1500 proceeds to block 1518.

At block 1516, hardware station 102 selects a physical code from the batch physical codes having the highest matching score and generates a notification to verify the identity at block 1520.

At block 1518, the hardware station generates a notification for identification of a counterfeit.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as required regarding every variation of the systems, methods, and/or apparatuses disclosed herein. Furthermore, references to "the disclosure" and/or "the present disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMS, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as limitation on the scope of the disclosure.

We claim:

1. A method for machine authentication of a physical object using computer vision and machine learning (ML) algorithms for comparing attributes of the physical object, the method comprising:

capturing an image of the physical object with computer vision;

focusing the computer vision on the physical object based on information of the physical object in the image;

capturing, in response to focusing the computer vision, a first analysis image of the physical object with the computer vision, wherein the first analysis image is covering less area than the image;

segmenting the first analysis image into a plurality of select patches, wherein a first set of features is determined from a select patch of the plurality of select patches;

determining the first set of features associated with the first analysis image using a ML model, wherein the ML model comprises a first set of functions for the first set of features;

generating a first feature-vector for the physical object based on the first set of features;

comparing the first feature-vector with a second feature-vector, wherein the second feature-vector is generated from a second set of features that is associated with a second analysis image; and generating, in response to comparing the first feature-vector with the second feature-vector, a notification associated with a status for machine authentication of the physical object wherein the select patch has a length of at least 1 cm and a width of at least 1 cm, the first analysis image has a resolution of at least 800 pixels per inch (ppi), and a count of features in the first set of features is at least ten.

2. The method of claim 1, further comprising:

receiving a categorization input; and determining, in response to reception of the categorization input, a first set of parameters and a second set of parameters for the physical object, wherein the first set of parameters corresponds to a first information associated with a structure of material of the physical object and the second set of parameters corresponds to a second information associated with a process of manufacturing the physical object, wherein the first set of features are determined based on the first set of parameters and the second set of the parameters using the ML model.

3. The method of claim 1, further comprising determining an object type for the physical object based on a categorization input, wherein each feature in the first set of features is selected from another set of features based on the object type.

4. The method of claim 3, wherein the determining of the object type is partially by classification of the image using the ML model.

5. The method of claim 3, further comprising:

determining that the object type is associated with a requirement of an artificial illumination; and generating, in response to the determination that the object type is associated with the requirement of the artificial illumination, an illumination signal to enable the artificial illumination on the physical object.

6. The method of claim 3, wherein the segmentation of the first analysis image further comprises:

determining, based on the object type, an information associated with features in the first set of features;

assigning a context score to each feature in the first set of features based on the information;

determining one or more select features from the first set of features based on the context score of each feature in the first set of features;

determining presence of a select feature of the one or more select features in each patch of the plurality of select patches; and identifying, in response to the determination of presence of the select feature in a patch of the plurality of select patches, the patch as the select patch.

7. The method of claim 1, further comprising:

determining a relative alignment of the physical object with respect to a camera that is used to capture the first analysis image;

comparing the relative alignment with a pre defined alignment;

determining, based on the comparison of the relative alignment with the predefined alignment, that a change in relative alignment is required; and generating, in response to the determination that the change in the relative alignment is required, a notification for requirement of the change in the relative alignment of the physical object with respect to the camera.

8. The method of claim 7, further comprising presenting the notification for requirement of the change in the relative alignment of the physical object with respect to the camera on an augmented reality interface.

9. A computer-program product tangibly embodied in a non-transitory machine-readable storage medium, including instructions configured to cause a data processing apparatus to perform operations, for machine authentication of a physical object using a computer vision model and machine learning (ML) algorithms for comparing attributes of the physical object, the operations comprising:

capturing an image of the physical object with computer vision;

focusing the computer vision on the physical object based on information of the physical object in the image;

capturing, in response to focusing the computer vision, a first analysis image of the physical object with the computer vision, wherein the first analysis image is covering less area than the image;

segmenting the first analysis image into a plurality of select patches, wherein a first set of features is determined from a select patch of the plurality of select patches;

determining the first set of features associated with the first analysis image using a ML model, wherein the ML model comprises a first set of functions for the first set of features;

generating a first feature-vector for the physical object based on the first set of features comparing the first feature-vector with a second feature-vector, wherein the second feature-vector is generated from a second set of features that is associated with a second analysis image; and generating, in response to comparing the first feature-vector with the second feature-vector, a notification associated with a status for machine authentication of the physical object, wherein the select patch has a length of at least 1 cm and a width of at least 1 cm, the first analysis image has a resolution of at least 800 pixels per inch (ppi), and a count of features in the first set of features is at least ten.

10. The computer-program product of claim 9, wherein the operations further comprises:

receiving a categorization input; and determining, in response to reception of the categorization input, a first set of parameters and a second set of parameters for the physical object, wherein the first set of parameters corresponds to a first information associated with a structure of material of the physical object and the second set of parameters corresponds to a second information associated with a process of manufacturing the physical object, wherein the first set of features are determined based on the first set of parameters and the second set of the parameters using the ML model.

11. The computer-program product of claim 9, wherein the operations further comprise determining an object type for the physical object based on a categorization input, wherein each feature in the first set of features is selected from another set of features based on the object type.

12. The computer-program product of claim 11, wherein the determination of the object type is partially by classification of the image using the ML model.

13. The computer-program product of claim 11, wherein the operations further comprises:

determining that the object type is associated with a requirement of an artificial illumination; and generating, in response to the determination that the object type is associated with the requirement of the artificial illumination, an illumination signal to enable the artificial illumination on the physical object.

14. The computer-program product of claim 11, wherein the segmentation of the first analysis image further comprises:

determining, based on the object type, an information associated with features in the first set of features;

assigning a context score to each feature in the first set of features based on the information;

determining one or more select features from the first set of features based on the context score of each feature in the first set of features;

determining presence of a select feature of the one or more select features in each patch of the plurality of select patches; and identifying, in response to the determination of presence of the select feature in a patch of the plurality of select patches, the patch as the select patch.

15. The computer-program product of claim 9, wherein the operations further comprises:

determining a relative alignment of the physical object with respect to a camera that is used to capture the first analysis image;

comparing the relative alignment with a pre defined alignment;

determining, based on the comparison of the relative alignment with the predefined alignment, that a change in relative alignment is required; and generating, in response to the determination that the change in the relative alignment is required, a notification for requirement of the change in the relative alignment of the physical object with respect to the camera.

16. The computer-program product of claim 9, wherein the operations further comprise presenting the notification for requirement of the change in the relative alignment of the physical object with respect to the camera on an augmented reality interface.

\*  \*  \*  \*  \*